(12) United States Patent
Fujii et al.

(10) Patent No.: US 10,222,651 B2
(45) Date of Patent: Mar. 5, 2019

(54) LIGHT FLUX CONTROLLING MEMBER, LIGHT EMITTING DEVICE, SURFACE LIGHT SOURCE DEVICE AND DISPLAY DEVICE

(71) Applicant: Enplas Corporation, Saitama (JP)

(72) Inventors: Yuki Fujii, Saitama (JP); Yu Kamijo, Saitama (JP)

(73) Assignee: ENPLAS CORPORATION, Saitama (JP)

( * ) Notice: Subject to any disclaimer, the term of this patent is extended or adjusted under 35 U.S.C. 154(b) by 0 days.

(21) Appl. No.: 15/738,252

(22) PCT Filed: Jun. 22, 2016

(86) PCT No.: PCT/JP2016/068545
§ 371 (c)(1),
(2) Date: Dec. 20, 2017

(87) PCT Pub. No.: WO2017/002686
PCT Pub. Date: Jan. 5, 2017

(65) Prior Publication Data
US 2018/0188608 A1    Jul. 5, 2018

(30) Foreign Application Priority Data

Jul. 1, 2015  (JP) .................................. 2015-132803
May 24, 2016  (JP) .................................. 2016-103266

(51) Int. Cl.
*G09F 13/04* (2006.01)
*G02F 1/1335* (2006.01)
*G02B 3/00* (2006.01)

(52) U.S. Cl.
CPC .......... *G02F 1/133611* (2013.01); *G02B 3/00* (2013.01); *G02F 1/133603* (2013.01);
(Continued)

(58) Field of Classification Search
CPC .............. F21Y 2115/10; F21Y 2101/00; F21Y 2101/02; F21V 5/04; F21V 13/04;
(Continued)

(56) References Cited

U.S. PATENT DOCUMENTS 8,251,547 B2 *  8/2012  Yamaguchi .............. G02B 3/04
                                                          362/307
2009/0116245 A1 *  5/2009  Yamaguchi .............. G02B 3/04
                                                          362/311.01
(Continued)

FOREIGN PATENT DOCUMENTS

EP          2287653 A1      2/2011
JP       2009-117207 A      5/2009
(Continued)

OTHER PUBLICATIONS

International Search Report from International Application No. PCT/JP2016/068545 dated Sep. 13, 2016.

*Primary Examiner* — Thien M Le
(74) *Attorney, Agent, or Firm* — Brundidge & Stanger, P.C.

(57) ABSTRACT

A light flux controlling member that controls the light distribution of light emitted from a light emitting element is provided. This light flux controlling member has: an incidence surface constituted by an inner surface of a first concavity formed on a rear side of the light flux controlling member; an emission surface from which light incident on the incidence surface is emitted to the outside; and a second concavity formed on the rear side. The second concavity has a first inclined surface and a second inclined surface both inclined with respect to an imaginary straight line perpendicular to a central axis. The second inclined surface is formed in a region closer to the central axis than the first inclined surface. The first inclined surface is inclined at an angle reflecting at least part of incident light at the incidence surface and then Fresnel reflected at the emission surface.

8 Claims, 24 Drawing Sheets

(52) U.S. Cl.
CPC ............... *G02F 1/133606* (2013.01); *G02F 2001/133607* (2013.01)

(58) Field of Classification Search
CPC ........ F21V 13/02; F21V 5/048; F21V 7/0066; F21V 17/101; F21V 23/001; F21V 23/005; F21V 5/00; F21V 5/002; F21V 5/008; F21V 5/045
USPC ........................................................ 362/97.1
See application file for complete search history.

(56) References Cited

U.S. PATENT DOCUMENTS

| | | | |
|---|---|---|---|
| 2012/0206673 A1* | 8/2012 | Ogata | G02F 1/133603 349/69 |
| 2013/0114021 A1 | 5/2013 | Iiyama et al. | |
| 2013/0343058 A1* | 12/2013 | Yamaguchi | G02B 3/0037 362/291 |
| 2014/0056006 A1* | 2/2014 | Jongewaard | F21V 13/04 362/296.01 |
| 2014/0119027 A1* | 5/2014 | Takatori | G02B 19/0014 362/297 |
| 2014/0168999 A1 | 6/2014 | Li et al. | |
| 2015/0192275 A1* | 7/2015 | Seo | G02F 1/133603 362/97.1 |
| 2015/0260371 A1* | 9/2015 | Takatori | G02F 1/133603 362/97.1 |

FOREIGN PATENT DOCUMENTS

| | | |
|---|---|---|
| JP | 2011-023204 A | 2/2011 |
| JP | 2011-044315 A | 3/2011 |
| WO | 2012/164790 A1 | 12/2012 |

* cited by examiner

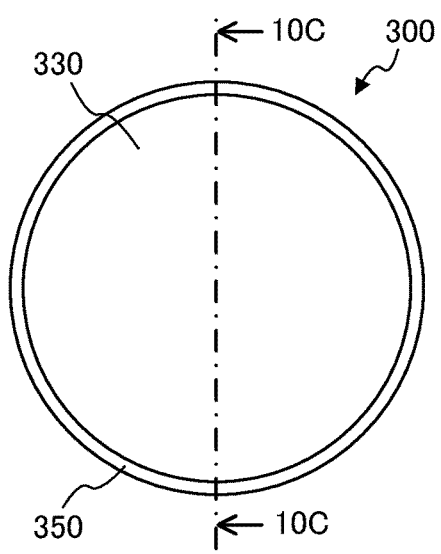 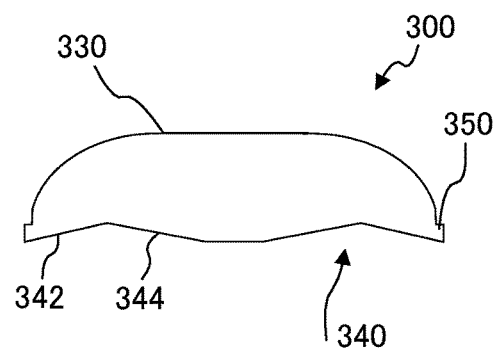
FIG. 10A  FIG. 10B
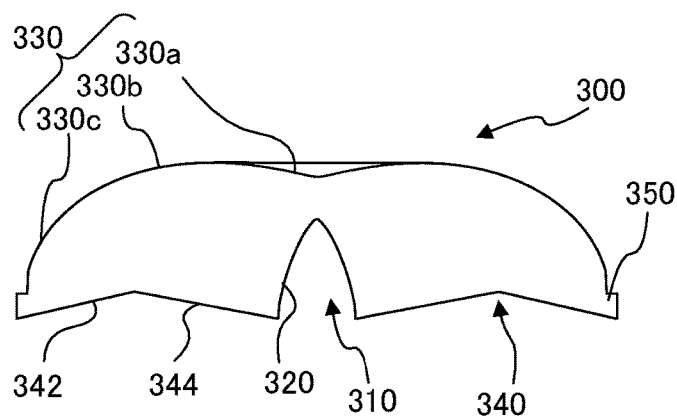
FIG. 10C

LIGHT FLUX CONTROLLING MEMBER, LIGHT EMITTING DEVICE, SURFACE LIGHT SOURCE DEVICE AND DISPLAY DEVICE

TECHNICAL FIELD

The present invention relates to a light flux controlling member configured to control distribution of light emitted from a light emitting element. Further, the present invention relates to a light emitting device including the light flux controlling member, a surface light source device including the light emitting device, and a display apparatus including the surface light source device.

BACKGROUND ART

Some transmission type image display apparatuses, such as liquid crystal display apparatuses employ a direct-type surface light source device as a backlight. In recent years, a direct-type surface light source device including a plurality of light emitting elements as a light source is increasingly used.

A direct-type surface light source device includes, for example, a substrate, a plurality of light emitting elements, a plurality of light flux controlling members (lenses) and a light diffusion member. The light emitting element is a light-emitting diode (LED), such as a white light emitting diode. The plurality of light emitting elements is disposed in a matrix on the substrate. Over each light emitting element, the light flux controlling member is disposed for expanding light emitted from the light emitting element in the surface directions of the substrate. The light emitted from the light flux controlling member is diffused by the light diffusion member, and planarly illuminates a member to be irradiated (e.g. a liquid crystal panel).

FIGS. 1A to 1C illustrate a configuration of a conventional light flux controlling member. FIG. 1A is a perspective view from the rear side, FIG. 1B is a cross-sectional perspective view from the rear side, and FIG. 1C is a cross-sectional view. In FIGS. 1A and 1B, legs formed on the rear side are not illustrated. As illustrated in FIGS. 1A to 1C, conventional light flux controlling member 20 includes incidence surface 22 on which light emitted from a light emitting element is incident and emission surface 24 emitting the light incident on incidence surface 22 toward outside. Incidence surface 22 is a surface with a recessed shape relative to the light emitting element and formed so as to face a light emitting surface of the light emitting element.

FIGS. 2A and 2B are views of optical paths in light flux controlling member 20. FIGS. 2A and 2B illustrate an optical path of a beam emitted from the light emitting center of light emitting element 10 at emission angles of 30° and 40°, respectively. As used herein, "emission angle" is an angle of an emitted beam (θ in FIG. 2A) relative to optical axis OA of light emitting element 10. In FIGS. 2A and 2B, legs formed on the rear side are also not illustrated.

As illustrated in FIGS. 2A and 2B, light emitted from light emitting element 10 enters light flux controlling member 20 from incidence surface 22. The light entering light flux controlling member 20 reaches emission surface 24, and is emitted toward outside from emission surface 24 (solid arrow). At this time, the light is refracted according to the shape of emission surface 24, so that the traveling direction of the light can be controlled. On the other hand, a part of the light reaching emission surface 24 is reflected by emission surface 24 (fresnel reflection) and reaches rear surface 26 facing the substrate on which light emitting element 10 is mounted (dashed arrow). Reflection at rear surface 26 of the light reaching rear surface 26 causes excessive light to travel to immediately above light flux controlling member 20, thereby generating an uneven luminance distribution (uneven luminance) of light emitted from a light emitting device. Emission from rear surface 26 of the light reaching rear surface 26 causes the light to be absorbed into the substrate, thereby increasing the loss of light. PTL 1 proposes a light flux controlling member that can solve such problems.

FIGS. 3A to 3C illustrate a configuration of a light flux controlling member disclosed in PTL 1. FIG. 3A is a perspective view from the rear side, FIG. 3B is a cross-sectional perspective view from the rear side, and FIG. 3C is a cross-sectional view. In FIGS. 3A and 3B, legs formed on the rear side are not illustrated. As illustrated in FIGS. 3A to 3C, in rear surface 26 of light flux controlling member 30 disclosed in PTL 1, formed are a recess including inclining surface 32 on an outer side, and surface 34 substantially parallel to central axis CA on an inner side. Inclining surface 32 is rotationally symmetric (circularly symmetric) about central axis CA of light flux controlling member 30, and inclines at a predetermined angle (e.g. 45°) relative to a virtual straight line orthogonal to central axis CA.

FIGS. 4A and 4B are views of optical paths in light flux controlling member 30. FIGS. 4A and 4B illustrate an optical path of a beam emitted from the light emitting center of light emitting element 10 at emission angles of 30° and 40°, respectively. In FIGS. 4A and 4B, legs formed on the rear side are also not illustrated. As illustrated in FIGS. 4A and 4B, fresnel-reflected light at emission surface 24 reaches a predetermined region on rear surface 26. Forming inclining surface 32 in the predetermined region enables changing the direction of at least a part of the light reaching inclining surface 32 by reflection to a lateral direction (see FIGS. 4A and 4B).

In light flux controlling member 30 disclosed in PTL 1, the light reflected by emission surface 24 is less likely to become light traveling to immediately above light flux controlling member 30, or is less likely to be absorbed into the substrate. Therefore, a light emitting device including light flux controlling member 30 disclosed in PTL 1 can radiate light uniformly and efficiently compared to a light emitting device including a conventional light flux controlling member.

In recent years, chip-on-board (COB) LEDs are used for lighting due to their easy mounting and high light emission efficiency. The COB LEDs are known to emit more light in lateral directions than conventional LEDs do, in addition to emission of light upward.

CITATION LIST

Patent Literature

PTL 1
Japanese Patent Application Laid-Open No. 2011-23204

SUMMARY OF INVENTION

Technical Problem

When using the COB LED as a light emitting element of a surface light source device disclosed in PTL 1, the height difference between the rear surface of a light flux controlling member and the upper surface of the light emitting element is reduced in order to allow more light emitted in lateral directions of the LED to enter the light flux controlling member from incidence surface 22. The light, which is emitted in lateral directions of the light emitting element and enters the light flux controlling member, is propagated inside the light flux controlling member and reaches inner surface 34 which forms the recess. This light passes through inner surface 34, and, according to the surface state of surface 34, is scattered. Further, a large portion of the light passing through surface 34 is refracted by inclining surface 32 to travel in a direction toward the vicinity of the upper part of the light emitting device (see FIG. 5). The scattering of light at inner surface 34 and refracting of light at inclining surface 32 cause excessive light to travel toward the vicinity of the upper part of the light emitting device, thereby generating an annular-shaped region having high luminance in the vicinity of the upper part of the light emitting device and thus generating uneven luminance.

The present invention has been made under the above circumstances, and an object of the present invention is to provide a light flux controlling member including an inclining surface for further reflecting light reflected by an emission surface. The light flux controlling member is less likely to generate uneven luminance of light emitted therefrom even when a light emitting element that emits more light in lateral directions, such as a COB LED, is used with the light flux controlling member.

Another object of the present invention is to provide a light emitting device including the light flux controlling member, a surface light source device including the light emitting device, and a display apparatus including the surface light source device.

Solution to Problem

A light flux controlling member of the present invention has a configuration such that the light flux controlling member includes an incidence surface which is an inner surface of a first recess formed on the rear side of the light flux controlling member so as to intersect the central axis of the light flux controlling member, and on which light emitted from the light emitting element is incident; an emission surface which is formed on the front side of the light flux controlling member so as to intersect the central axis, and which emits the light incident on the incidence surface toward outside of the light flux controlling member; and a second recess which is formed on the rear side so as to surround the central axis on an outer side compared to the incidence surface, and which is recessed toward inside of the light flux controlling member. The second recess includes a first inclining surface and a second inclining surface both inclining relative to a virtual straight line orthogonal to the central axis, in which the second inclining surface is formed in a region closer to the central axis than the first inclining surface is; the first inclining surface inclines at an angle such that at least a part of light entering the light flux controlling member from the incidence surface and reflected by fresnel reflection at the emission surface is reflected, and inclines in a direction toward the rear side as being further away from the central axis; and the second inclining surface inclines in a direction toward the front side as being further away from the central axis.

A light emitting device of the present invention has a configuration such that the light emitting device includes a light emitting element and the light flux controlling member of the present invention, and the light flux controlling member is disposed so that the central axis coincides with the optical axis of the light emitting element.

A surface light source device of the present invention has a configuration such that the surface light source device includes the light emitting device of the present invention, and a light diffusion member for diffusing and transmitting light emitted from the light emitting device at the same time.

A display apparatus of the present invention has a configuration such that the display apparatus includes the surface light source device of the present invention, and a display member to be irradiated with light emitted from the surface light source device.

Advantageous Effects of Invention

The light flux controlling member of the present invention is less likely to generate uneven luminance of light emitted therefrom even when a light emitting element that emits more light in lateral directions, such as a COB LED, is used with the light flux controlling member.

Further, the light emitting device, the surface light source device and the display apparatus of the present invention are less likely to generate uneven luminance of light emitted therefrom since they include the light flux controlling member which is less likely to generate uneven luminance.

BRIEF DESCRIPTION OF DRAWINGS

FIGS. 10A to 10C illustrate the configuration of the light flux controlling member according to the present invention;

DESCRIPTION OF EMBODIMENTS

Hereinafter, a light flux controlling member, a light emitting device, a surface light source device and a display apparatus of the present invention will be described in detail with reference to the accompanying drawings. In the following description, as representative examples of surface light source devices of the present invention, surface light source devices suitable for backlights of liquid crystal display apparatuses or the like will be described. These surface light source devices may be used as display apparatuses in combination with members to be irradiated (e.g. liquid crystal panels) for irradiation with light from the surface light source devices.

[Configurations of Surface Light Source Device and Light Emitting Device]

Figure 6A:
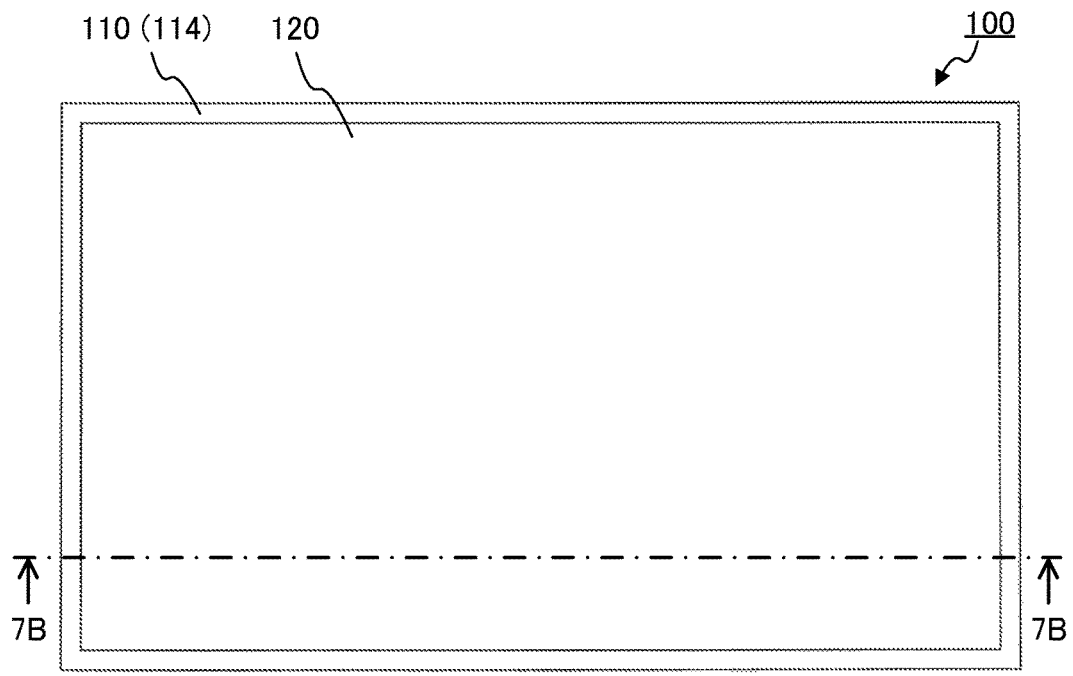
FIGS. 6A and 6B illustrate a configuration of a surface light source device according to the present invention.
Figure 6B:
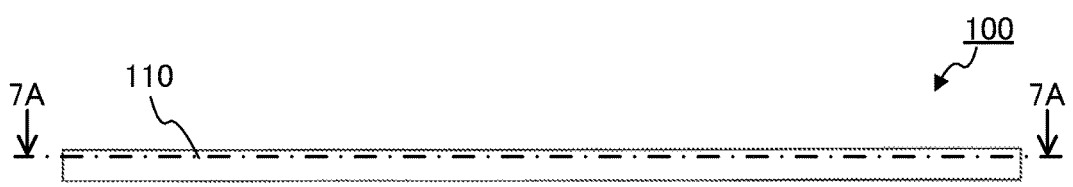
Figure 7A:
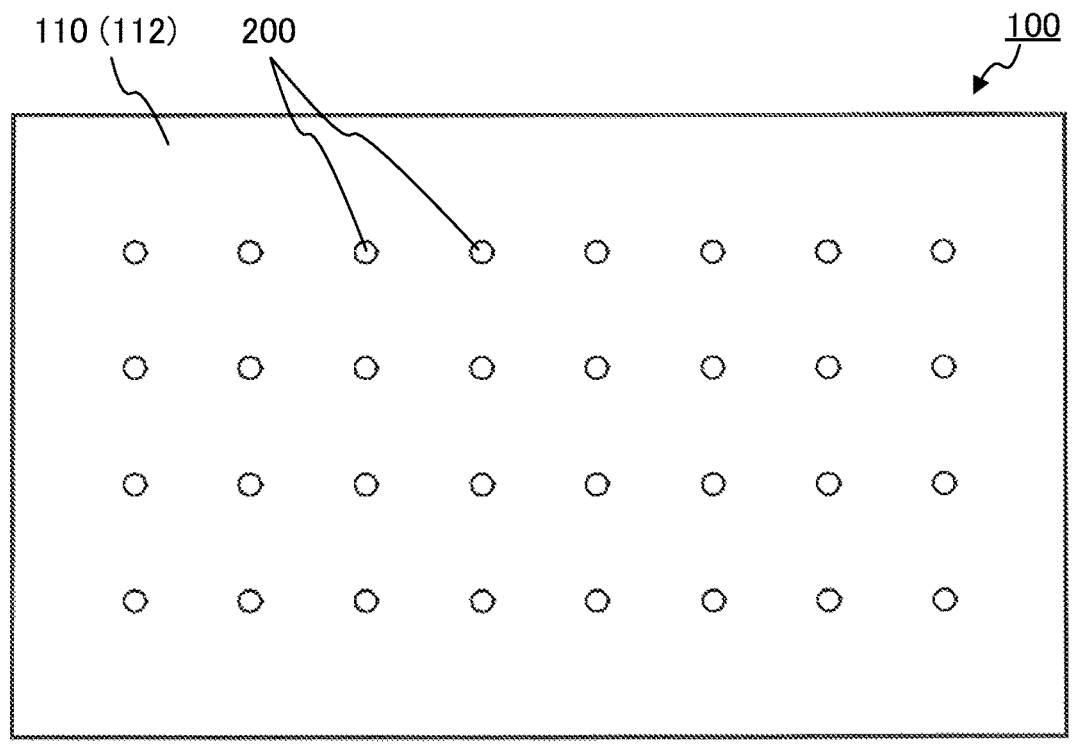
FIGS. 7A and 7B are cross-sectional views illustrating the configuration of the surface light source device according to the present invention.
Figure 7B:
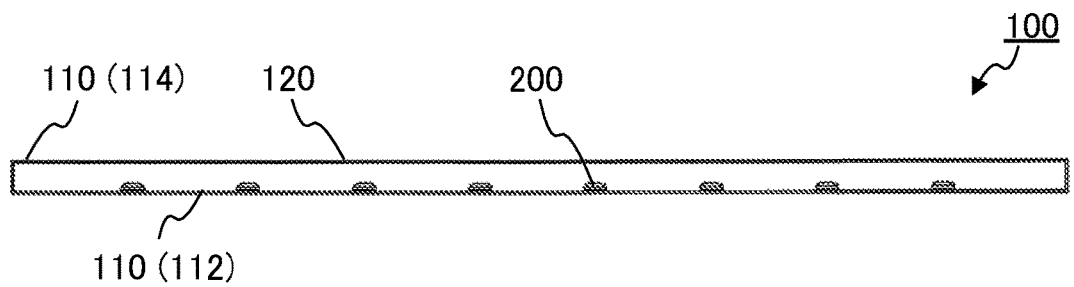
Figure 8:
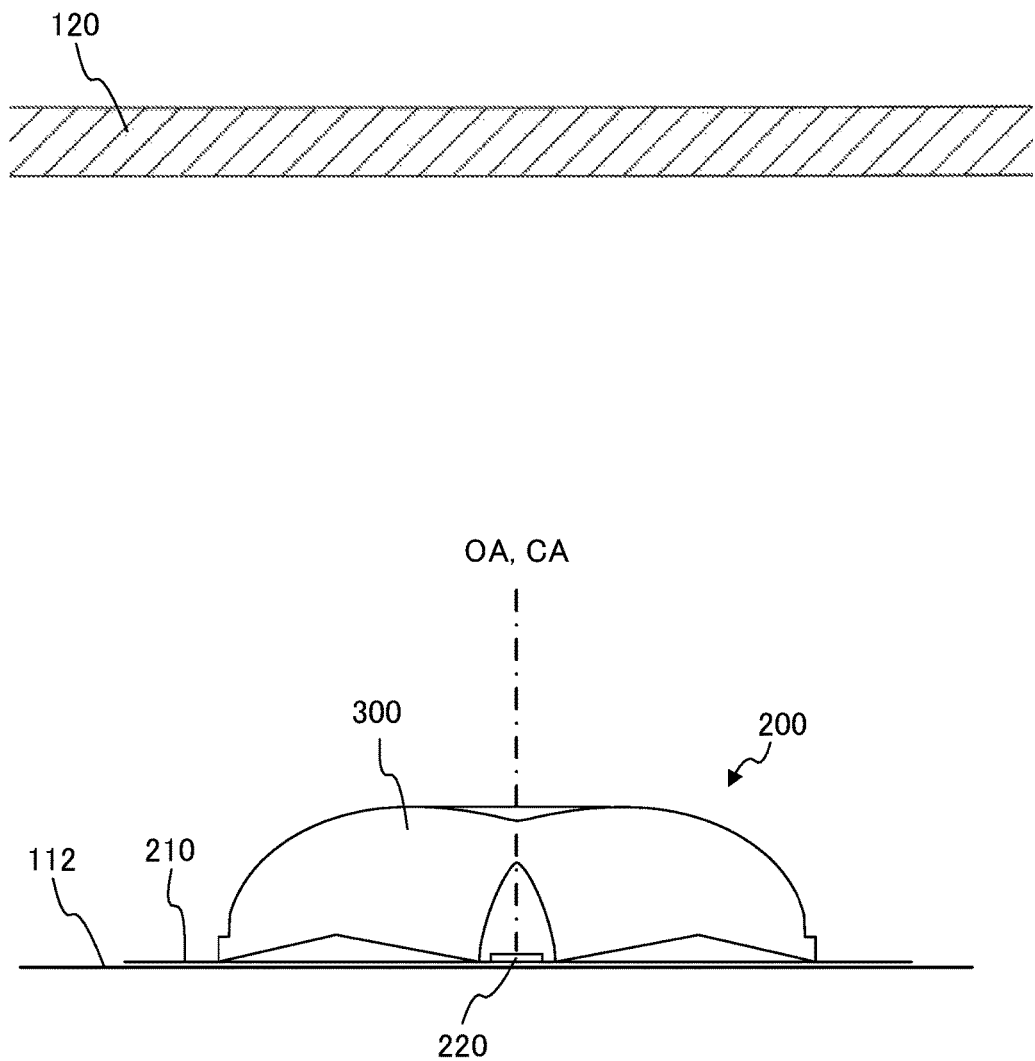
FIG. 8 is a partially enlarged cross-sectional view of a part of FIG. 7B.

FIGS. 6A to 8 illustrate a configuration of a surface light source device of the present invention. FIG. 6A is a plan view, and FIG. 6B is a front view. FIG. 7A is a cross-sectional view taken along line 7A-7A shown in FIG. 6B, and FIG. 7B is a cross-sectional view taken along line 7B-7B shown in FIG. 6A. FIG. 8 is a partially enlarged cross-sectional view of a part of FIG. 7B.

As illustrated in FIGS. 6A to 7B, surface light source device 100 of the present invention includes casing 110, a plurality of light emitting devices 200 and light diffusion member 120. Light emitting elements 200 are disposed in a matrix on bottom plate 112 of casing 110. The inner surface of bottom plate 112 functions as a diffusion and reflection surface. Further, top plate 114 of casing 110 is provided with an opening. Light diffusion member 120 is disposed so as to cover the opening, and functions as a light emitting surface. The size of the light emitting surface may be, for example, about 400 mm×about 700 mm.

As illustrated in FIGS. 7A to 8, light emitting devices 200 are each fixed on substrate 210. A plurality of substrates 210 are each fixed on bottom plate 112 of casing 110 at a predetermined position. As illustrated in FIG. 8, light emitting devices 200 each include light emitting element 200 and light flux controlling member 300.

Light emitting element 220 is a light source of surface light source device 100, and mounted on substrate 210. Light emitting element 220 is a light emitting diode (LED), such as a white light emitting diode. Light emitting element 220 is preferably a chip-on-board (COB) LED due to its easy mounting and high light emission efficiently.

COB LEDs are known to emit more light in lateral directions than conventional LEDs do. When light emitting element 220 is an element that emits more light in lateral directions, such as a COB LED, the upper surface of the light emitting element is preferably at a higher position in the vertical direction than the lower end of (below-described) first recess 310 included in the light flux controlling member is, for allowing more light emitted in the lateral directions of the LED to enter the light flux controlling member.

Light flux controlling member 300 is a lens, and is fixed on substrate 210. Light flux controlling member 300 is for controlling distribution of light emitted from light emitting element 220 to expand the traveling direction of the light to surface directions of the substrate. Light flux controlling member 300 is disposed above light emitting element 220 so that central axis CA thereof coincides with optical axis OA of light emitting element 220 (see FIG. 8). Below-described incidence surface 320 and emission surface 330 of light flux controlling member 300 are both rotationally symmetric (circularly symmetric), and rotation axes thereof coincide with each other. The rotation axes of incidence surface 320 and emission surface 330 are referred to as "central axis CA of a light flux controlling member." Further, "optical axis OA of a light emitting element" means a center beam of a stereoscopic light flux from light emitting element 220.

Light flux controlling member 300 can be formed using, e.g., a piece-mold consisting of separate pieces by integral molding. The material of light flux controlling member 300 may be any material that can transmit light with a desired wavelength. For example, the material of light flux controlling member 300 is a light-transmissive resin, such as polymethylmethacrylate (PMMA), polycarbonate (PC), epoxy resin (EP), or silicone resin.

Main features of surface light source device 100 according to the present invention lie in a configuration of light flux controlling member 300. Therefore, light flux controlling member 300 will be described in detail below.

Light diffusion member 120 is a plate-shaped member having light diffusivity for diffusing and transmitting light emitted from light emitting device 200 at the same time. Typically, light diffusion member 120 has a size substantially the same as a member to be irradiated, such as a liquid crystal panel. For example, light diffusion member 120 is formed of a light-transmissive resin, such as polymethylmethacrylate (PMMA), polycarbonate (PC), polystyrene (PS) or styrene-methylmethacrylate copolymer resin (MS). To confer light diffusivity, fine irregularities are formed on the surface of light diffusion member 120, or light diffusion elements, such as beads are dispersed in light diffusion member 120.

In surface light source device 100 according to the present invention, light emitted from each light emitting element 220 is expanded by light flux controlling member 300 to illuminate a broad area of light diffusion member 120. The light emitted from each light flux controlling member 300 is diffused further by light diffusion member 120. As a result, surface light source device 100 according to the present invention can uniformly illuminate a planar member to be irradiated (e.g. liquid crystal panel).

[Configuration of Light Flux Controlling Member]

Figure 9:
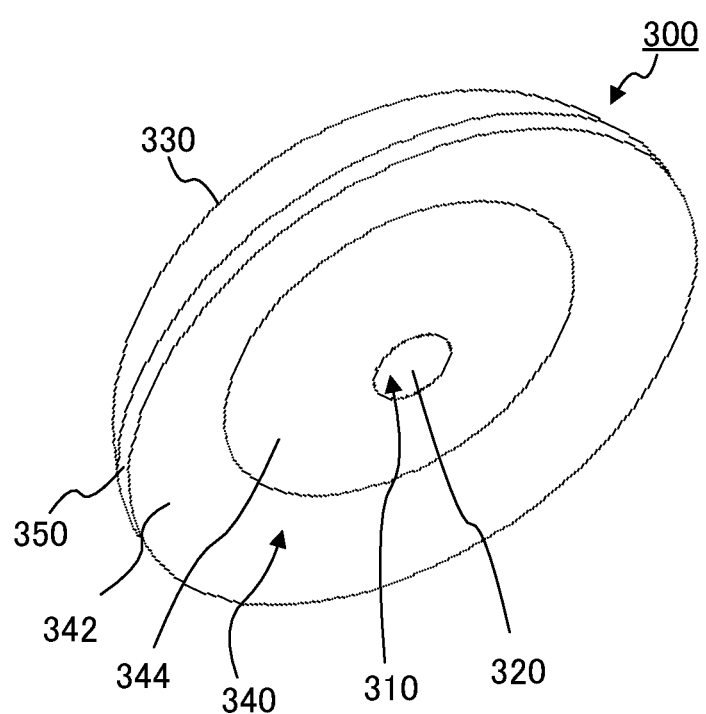
FIG. 9 illustrates a configuration of a light flux controlling member according to the present invention.

FIGS. 9 to 10C illustrate a configuration of light flux controlling member 300 according to the present invention. FIG. 9 is a perspective view from the rear side (substrate 210 side). FIG. 10A is a plan view, FIG. 10B is a front view, and FIG. 10C is a cross-sectional view taken along line 10C-10C shown in FIG. 10A.

As illustrated in FIG. 9, light flux controlling member 300 includes first recess 310, incidence surface 320, emission surface 330, second recess 340 and flange 350. Light flux controlling member 300 may include a rear surface or a plurality of legs (both not illustrated).

First recess 310 is formed in a central portion of the rear side (light emitting element 220 side) of light flux controlling member 300. The inner surface of first recess 310 functions as incidence surface 320. Incidence surface 320 is configured to allow most or all of light emitted from light emitting element 220 to enter the inside of light flux controlling member 300 while controlling the traveling direction of the light. Incidence surface 320 intersects central axis CA of light flux controlling member 300 and rotationally symmetric (circularly symmetric) about central axis CA.

Emission surface 330 is formed on the front side (light diffusion member 120 side) of light flux controlling member 300 so as to protrude from flange 350. Emission surface 330 is configured to emit the light entering light flux controlling member 300 while controlling the traveling direction of the light. Emission surface 330 intersects central axis CA and rotationally symmetric (circularly symmetric) about central axis CA.

Emission surface 330 includes first emission surface 330a located in a predetermined area about central axis CA, second emission surface 330b formed around and continued from first emission surface 330a, and third emission surface 330c connecting second emission surface 330b with flange 350 (see FIG. 10C). First emission surface 330a is a curved surface protruding to the rear side. Second emission surface 330b is a smoothly curved surface protruding to the front side and located around first emission surface 330a. Second emission surface 330b has an annular convex shape. Third emission surface 330c is a curved surface located around second emission surface 330b. In the cross-section illustrated in FIG. 10C, the cross-sectional shape of third emission surface 330c may be linear or curved.

Second recess 340 is formed on the rear side of the light flux controlling member so as to surround central axis CA on an outer side (in a region further from central axis CA) compared to first recess 310. Second recess 340 includes first inclining surface 342 formed on an outer side thereof, and second inclining surface 344 provided on an inner side thereof (in a region closer to central axis CA). Second recess 340 may further include a non-inclining part including a below-described non-inclining surface. Both first inclining surface 342 and second inclining surface 344 incline relative to a virtual straight line orthogonal to central axis CA. First inclining surface 342 inclines in a direction toward the rear side as first inclining surface 342 separates from the central axis. Second inclining surface 344 inclines in a direction toward the front side as second inclining surface 344 separates from the central axis. An inclining surface is a surface which inclines relative to a virtual straight line orthogonal to central axis CA, i.e. a surface which intersects the virtual straight line at a predetermined angle, and a non-inclining surface is a surface which is parallel to the virtual straight line orthogonal to central axis CA.

An inclination angle of an inclining surface (hereinafter also simply referred to as "inclination angle") relative to a virtual straight line orthogonal to central axis CA is, when the inclining surface in a cross-section including central axis CA is in the shape of a straight line, an angle between the straight line and the virtual straight line orthogonal to central axis CA, and when in the shape of a curved line, an angle between a straight line which connects points closest to and farthest from central axis CA in the inclining surface in the cross-section, and the virtual straight line orthogonal to central axis CA.

First inclining surface 342 and second inclining surface 344 may be continuously formed, or a non-inclining part may be formed between first inclining surface 342 and second inclining surface 344. When first inclining surface 342 and second inclining surface 344 are continuously formed, in a cross-section including central axis CA, first inclining surface 342 and second inclining surface 344 are directly connected, and the cross-sectional shape of second recess 340 is substantially V-shaped upside-down. When a non-inclining part is formed between first inclining surface 342 and second inclining surface 344, in a cross-section including central axis CA, first inclining surface 342 and second inclining surface 344 are connected via the non-inclining part. Connecting via a non-inclining part refers to a configuration such that line segments in the cross-section respectively represent first inclining surface 342 and second inclining surface 344 are disposed to form a cross-sectional shape of second recess 340 via a non-inclining surface (in this case, the cross-sectional shape of second recess 340 is substantially a trapezoid devoid of the bottom and with a shorter top (the side located on the front side)), or via a convex-shaped non-inclining part having a non-inclining surface formed on the top surface thereof.

Figure 11A:
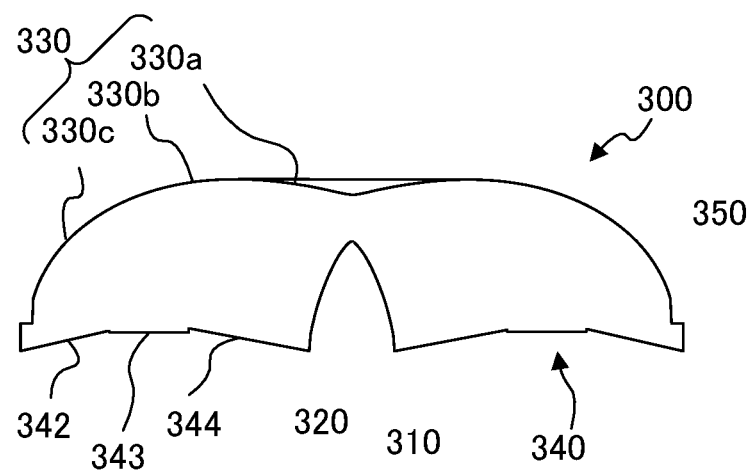
FIGS. 11A and 11B illustrate another configuration of a light flux controlling member according to the present invention.

The non-inclining surface formed between first inclining surface 342 and second inclining surface 344 can be used as a reference for alignment in the rotational direction about central axis CA and in the height direction along central axis CA, when a piece-mold for molding light flux controlling member 300 is formed from separated molds having transfer surfaces for molding first inclining surface 342 and second inclining surface 344, respectively. Light flux controlling member 300 having the non-inclining surface thus can be produced more easily. However, as obvious from the comparison between below-described FIGS. 16B and 16C, and FIGS. 17A and 17B, a light flux controlling member without a non-inclining surface is less likely to generate uneven luminance to a further extent. Therefore, for obtaining both ease of production and the uneven luminance suppressing effect, the non-inclining part is preferably disposed only in a part of an adjacent side between continuously formed first inclining surface 342 and second inclining surface 344, as illustrated in FIG. 11A, i.e., a cross-sectional view including central axis CA of light flux controlling member 300 which includes non-inclining surface 343, or in FIG. 11B, i.e., a perspective view from the rear side (substrate 210 side) thereof. In this case, in one cross-section including central axis CA, first inclining surface 342 and second inclining surface 344 are directly connected (FIG. 10C), and in another cross-section including central axis CA, first inclining surface 342 and second inclining surface 344 are connected via the non-inclining part (FIG. 11A), in light flux controlling member 300. First inclining surface 342 and non-inclining surface 343, or non-inclining surface 343 and second inclining surface 344 may be directly connected, or connected via another surface (such as a surface substantially parallel to central axis CA).

Figure 11B:
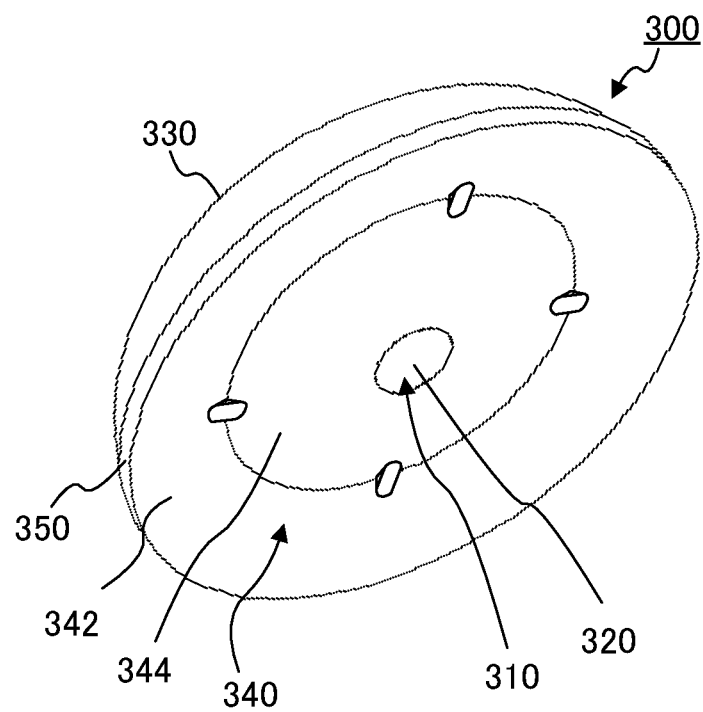

The planar shape of non-inclining surface 343 may be oval as illustrated in FIG. 11B, or circular or the like. For easier alignment between molds, light flux controlling member 300 preferably includes non-inclining parts at two respective positions substantially facing each other with central axis CA therebetween, and preferably includes at least one pair of the non-inclining parts substantially facing each other. Further, non-inclining surface 343 may be used as a measurement reference surface for accurately determining the positions of first inclining surface 342 and second inclining surface 344 in the height direction along central axis CA. In this case, for easy measurement and obtaining stable measurement results, light flux controlling member 300 preferably includes at least two non-inclining parts at respective positions rotationally symmetric about central axis CA. However, for suppressing generation of uneven luminance as much as possible, a smaller number of non-inclining parts in light flux controlling member 300 is preferred, and only two pairs of the non-inclining parts substantially facing each other are preferably included in view of the balance between the alignment effect and the uneven luminance suppressing effect.

Figure 1A:
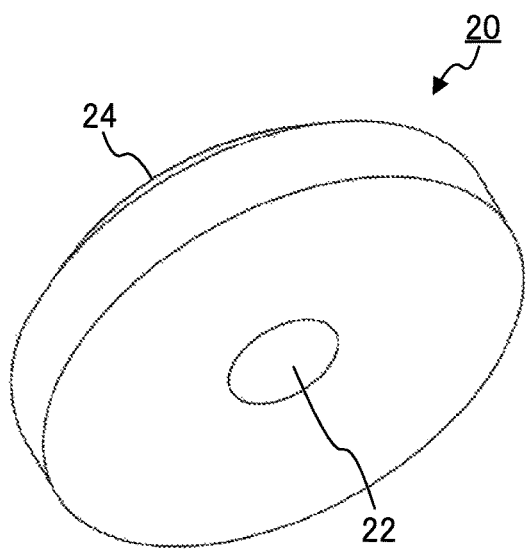
FIGS. 1A to 1C illustrate a configuration of a conventional light flux controlling member.
Figure 1B:
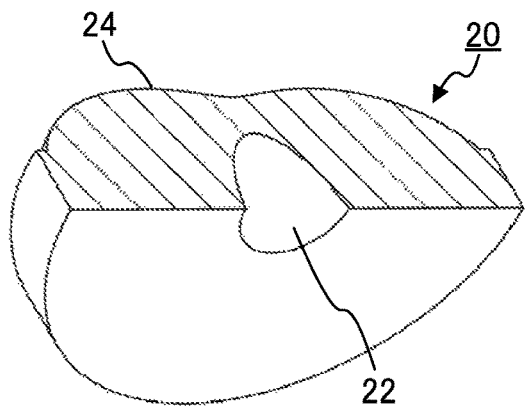
Figure 1C:
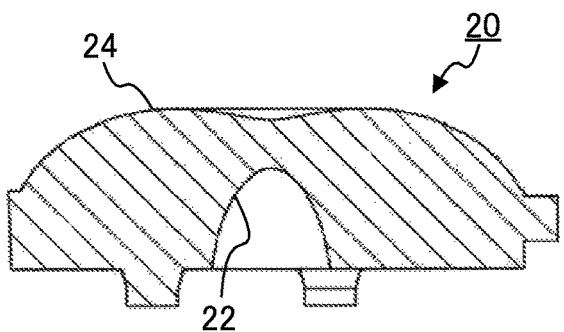
Figure 2A:
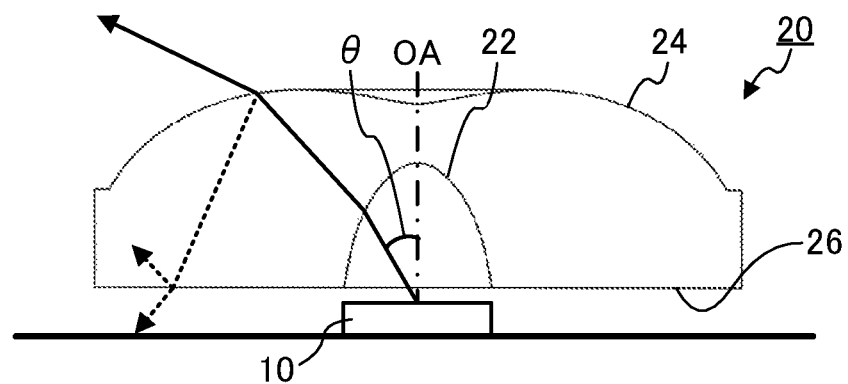
FIGS. 2A and 2B are views of optical paths in the light flux controlling member illustrated in FIGS. 1A to 1C.
Figure 2B:
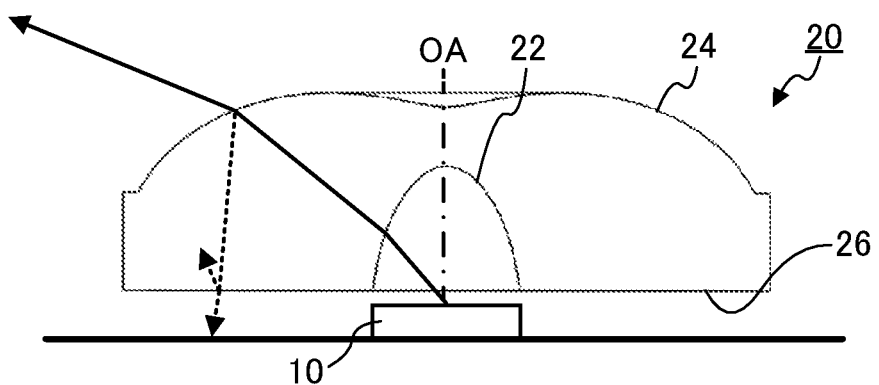
Figure 3A:
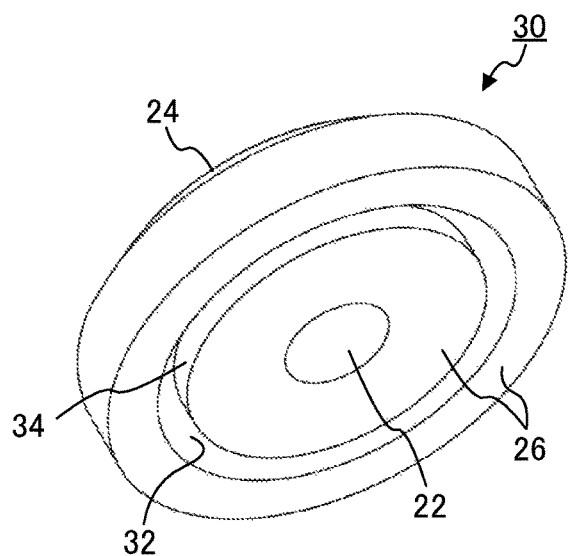
FIGS. 3A to 3C illustrate a configuration of a light flux controlling member disclosed in PTL 1.
Figure 3B:
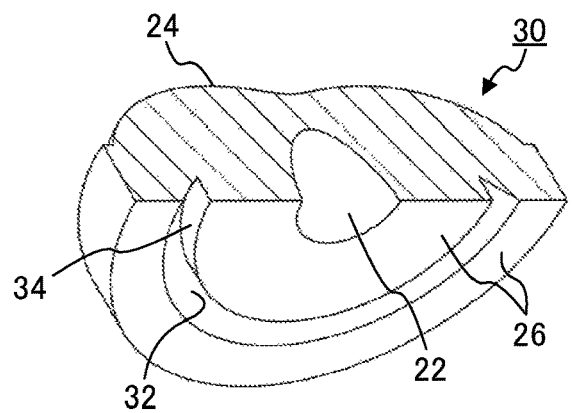
Figure 3C:
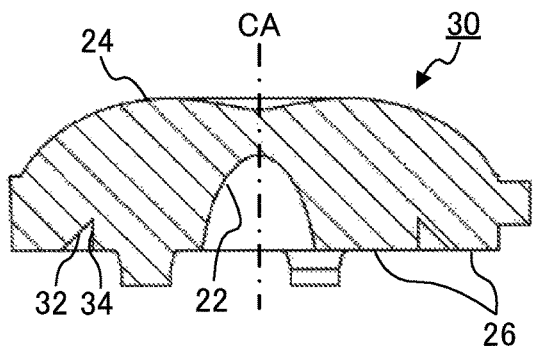
Figure 4A:
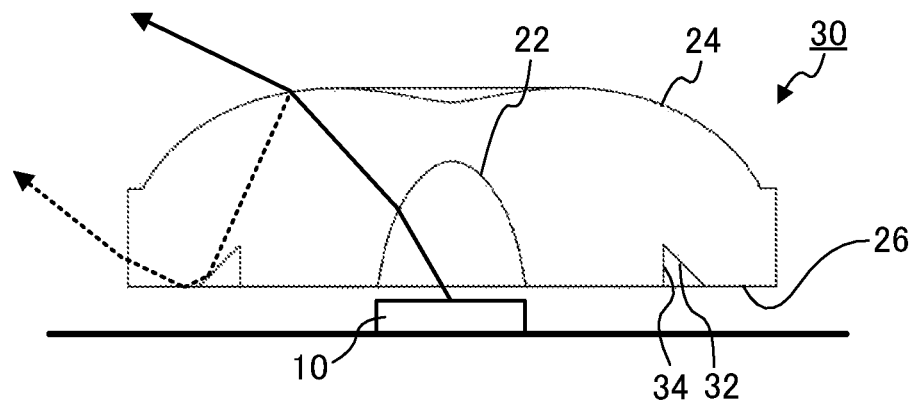
FIGS. 4A and 4B are views of optical paths in the light flux controlling member illustrated in FIGS. 3A to 3C.
Figure 4B:
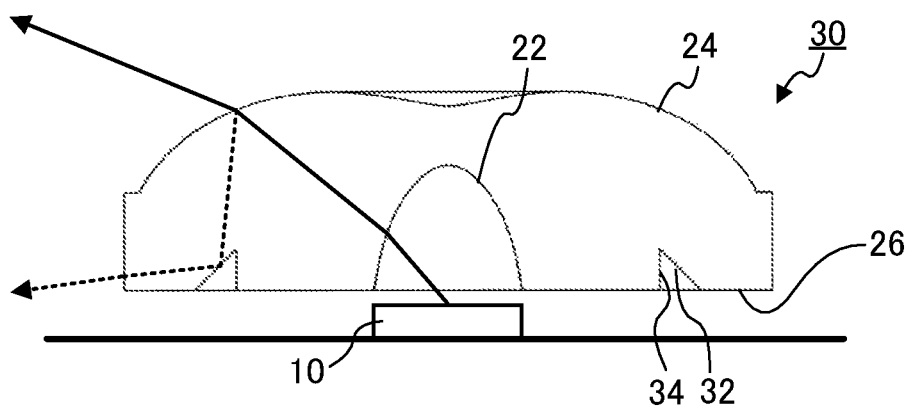

The inclination angle of first inclining surface 342 is determined so that at least a part of light entering light flux controlling member 300 from incidence surface 320 and reflected by fresnel reflection at emission surface 330 is reflected. Such configuration enables changing the direction of at least a part of the fresnel-reflected light reaching first inclining surface 342 by reflection at first inclining surface 342 to a lateral direction. Therefore, generation of uneven luminance due to further reflection at substrate 210 of light fresnel-reflected at emission surface 330, or loss of light due to absorption of the light into substrate 210 can be suppressed (see FIGS. 4A and 4B).

Figure 12A:
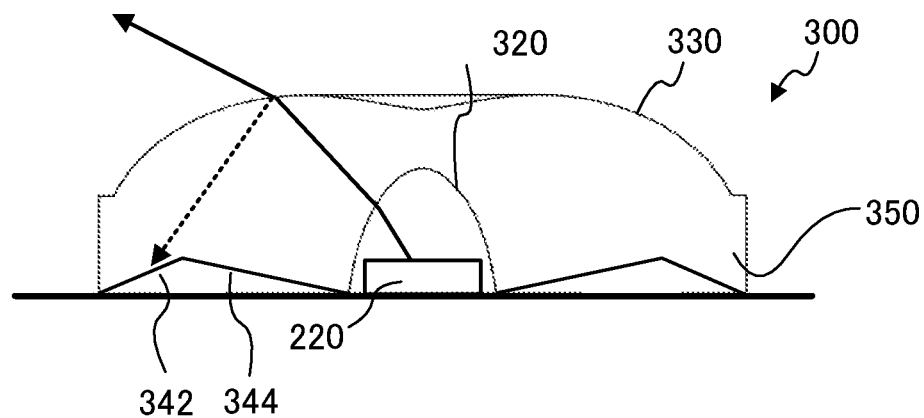
FIGS. 12A to 12C are views of optical paths in the light flux controlling member illustrated in FIGS. 10A to 10C.
Figure 12B:
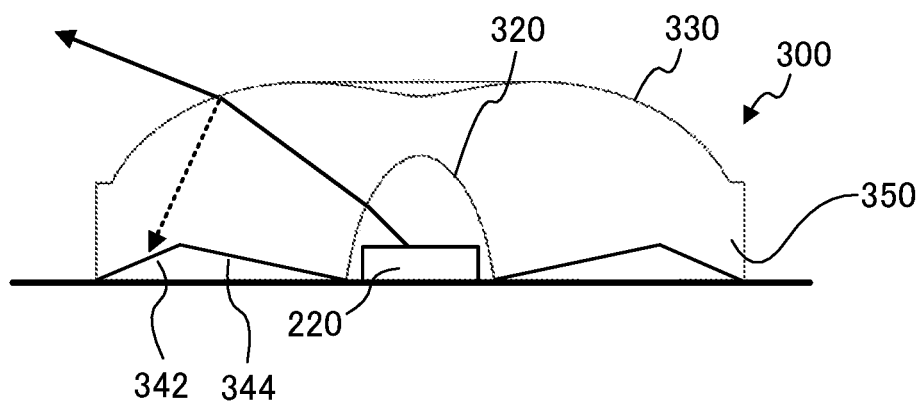
Figure 12C:
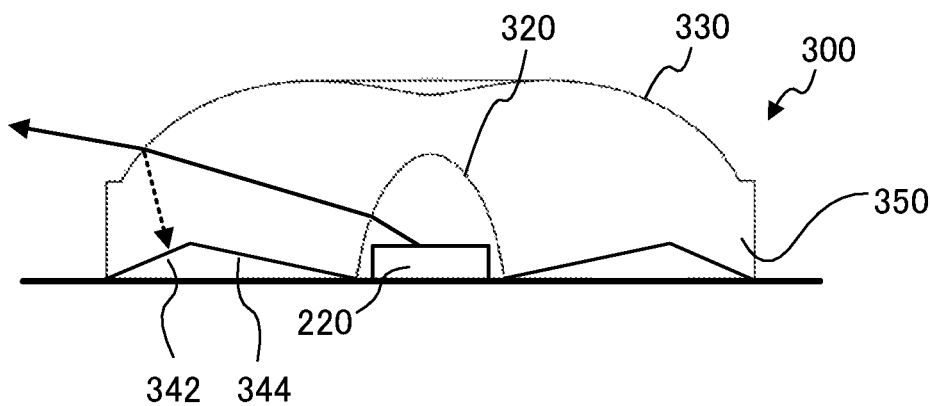

For allowing more light to travel in lateral directions, first inclining surface 342 may be provided, for example, in a region where light entering light flux controlling member 300 from incidence surface 320 and reflected by fresnel reflection at emission surface 330 reaches. Simulation can determine an optical path in which light incident on incidence surface 320 is reflected by fresnel reflection at emission surface 330 to reach the rear side of light flux controlling member 300. FIGS. 12A to 12C are views of optical paths in light flux controlling member 300. FIGS. 12A to 12C illustrate an optical path of a beam emitted from the light emitting center of light emitting element 220 at emission angles of 30°, 40° and 50°, respectively. As illustrated in FIGS. 12A to 12C, in light flux controlling member 300, light reflected by emission surface 330 reaches a predetermined region on the rear side of light flux controlling member 300 (in FIGS. 12A to 12C, a rear surface is formed). The region, where light entering light flux controlling member 300 from incidence surface 320 and reflected by fresnel reflection at emission surface 330 reaches, can be set by simulation for different angles so that most of the optical paths of those angles reach the region, for example.

Figure 13A:
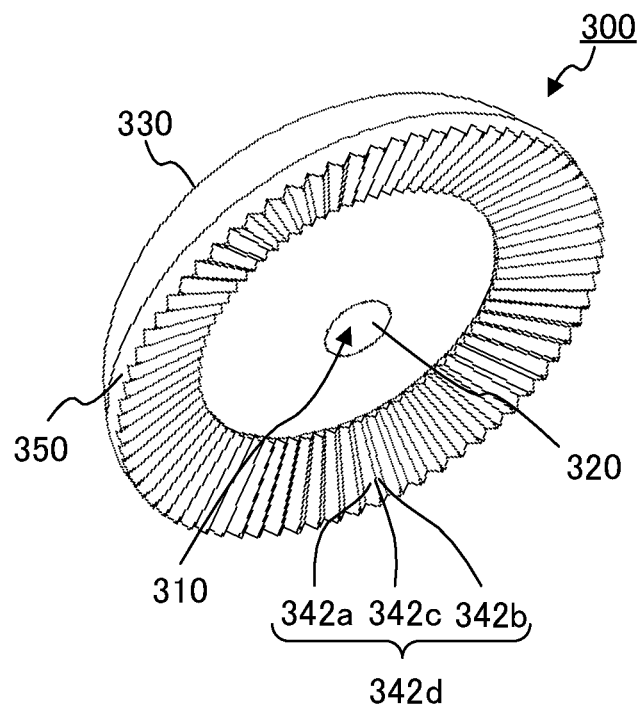
FIGS. 13A and 13B illustrate still another configuration of a light flux controlling member according to the present invention.
Figure 13B:
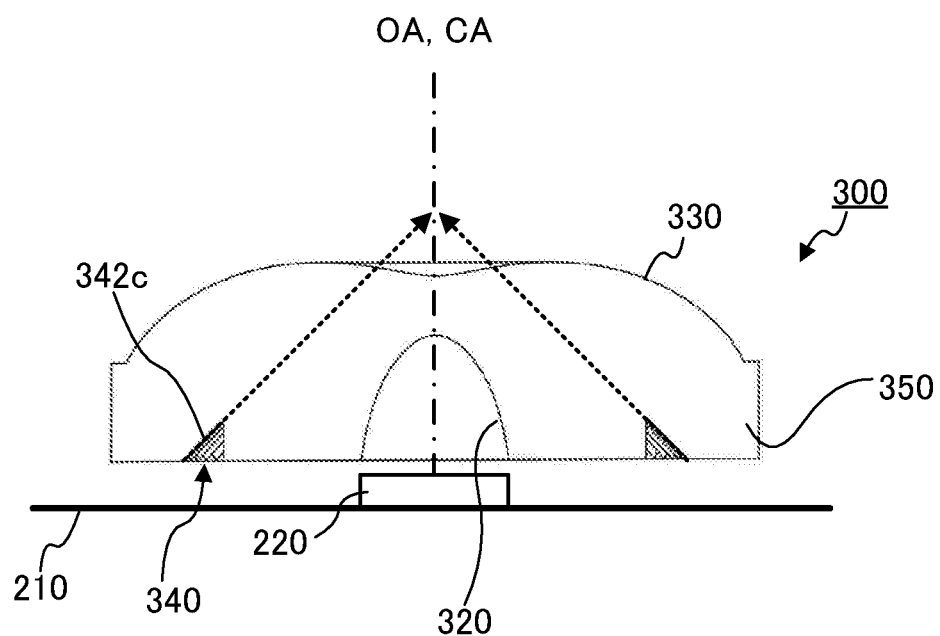

As illustrated in FIGS. 13A and 13B, first inclining surface 342 may be composed of protrusions 342d having a substantially triangle-shaped cross-section vertical to ridge line 342c, and rotationally symmetric about central axis CA (see FIG. 13A). Protrusion 342d includes planar first reflection surface 342a, planar second reflection surface 342b, and ridge line 342c that is an intersection line of first reflection surface 342a and second reflection surface 342b. Further, as illustrated in FIG. 13B, a virtual straight line including ridge line 342c intersects central axis CA at a position located on the front side compared to ridge line 342c. For simplifying the description, second inclining surface 344 is not illustrated in FIG. 13B. Protrusion 342d with such configuration functions like a total reflection prism, and further reflects the light, which is reflected by fresnel reflection to reach first inclining surface 342, in a lateral direction of light flux controlling member 300. Protrusions 342d thus further suppresses generation of uneven luminance and reduction of light use efficiency caused by light passing through first inclining surface 342 to reach a substrate immediately below light flux controlling member 300.

Figure 14:
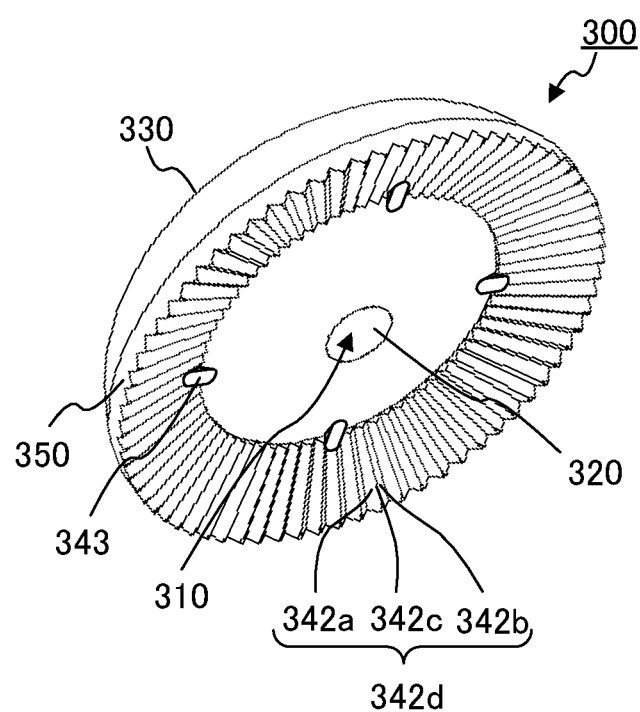
FIG. 14 illustrates still another configuration of a light flux controlling member according to the present invention.

As illustrated in FIG. 14, i.e., a perspective view from the rear side (substrate 210 side) of light flux controlling member 300, for easier alignment between molds, a non-inclining part including non-inclining surface 343 may also be formed in a part of an adjacent side between continuously formed first inclining surface 342 and second inclining surface 344 in light flux controlling member 300. Non-inclining surface 343 illustrated in FIG. 14 may be used as a reference surface during measurement of, e.g., the height of protrusion 342d and/or the depth of second recess 340 (the distance between the bottom of second recess 340 (the point closest to the front side in the surface of second recess 340) and a virtual straight line orthogonal to central axis CA and including the lower end of first recess 310 (the point closest to the rear side in the surface of first recess 310). The planar shape of non-inclining surface 343 may be oval as illustrated in FIG. 14, or circular or the like. For easier alignment between molds, light flux controlling member 300 preferably includes non-inclining parts at two respective positions substantially facing each other with central axis CA therebetween, and preferably includes at least one pair of the non-inclining parts substantially facing each other. From the perspective of using non-inclining surface 343 as a measurement reference surface for accurately determining the positions of first inclining surface 342 and second inclining surface 344 in the height direction along central axis CA, light flux controlling member 300 preferably includes at least two non-inclining parts at respective positions rotationally symmetric about central axis CA, for easy measurement and obtaining stable measurement results. However, for suppressing generation of uneven luminance as much as possible, a smaller number of non-inclining parts in light flux controlling member 300 is preferred, and only two pairs of the non-inclining parts substantially facing each other are preferably included in view of the balance between the alignment effect and the uneven luminance suppressing effect.

Second inclining surface 344 may be one truncated cone surface having a constant inclination angle (see below-described Embodiment 1), a surface composed of a combination of truncated cone surfaces having different inclination angles (see below-described Embodiment 2), or a curved surface having an inclination angle gradually changing toward outside (see below-described Embodiment 3). A truncated cone surface means a surface having a shape of a side surface of a truncated cone.

Second inclining surface 344 in the shape of one truncated cone surface having a constant inclination angle has the shape of a straight line in a cross-section passing central axis CA. Second inclining surface 344 assembled from a plurality of truncated cone surfaces having different inclination angles has the shape of a straight line refracted along the way in a cross-section passing central axis CA. Second inclining surface 344 being a curved surface having an inclination angle gradually changing toward outside has the shape of a curved line whose inclination angle gradually changes in a cross-section passing central axis CA.

Figure 5:
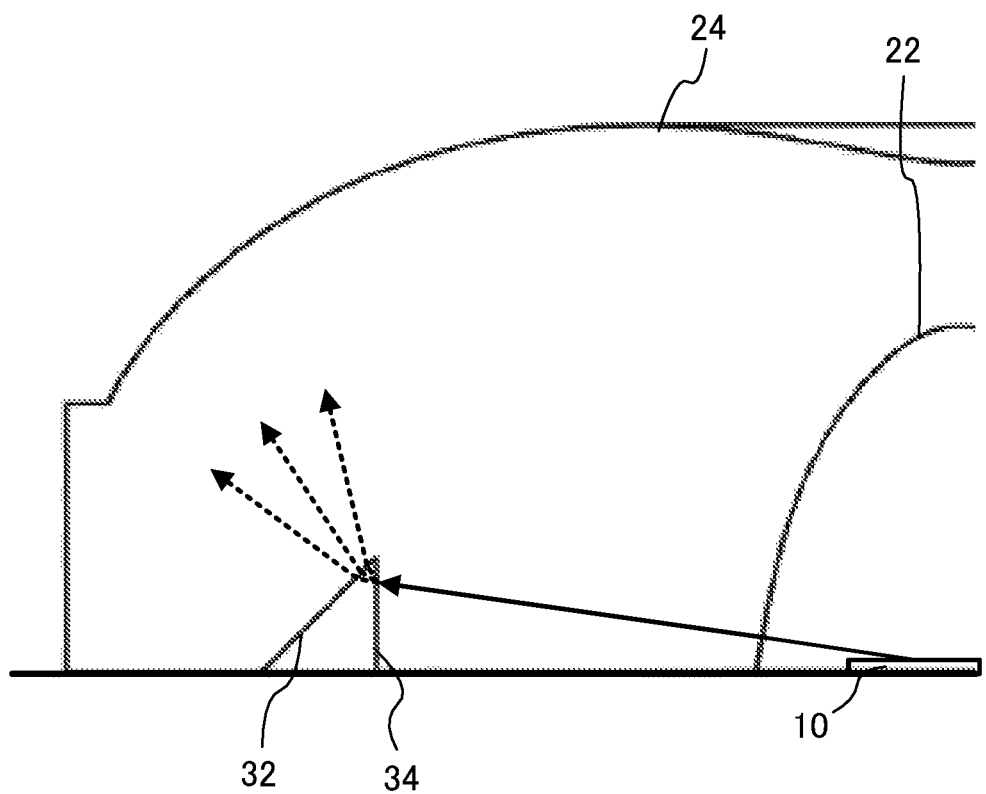
FIG. 5 is a view of another optical path in the light flux controlling member illustrated in FIGS. 3A to 3C.
Figure 15:
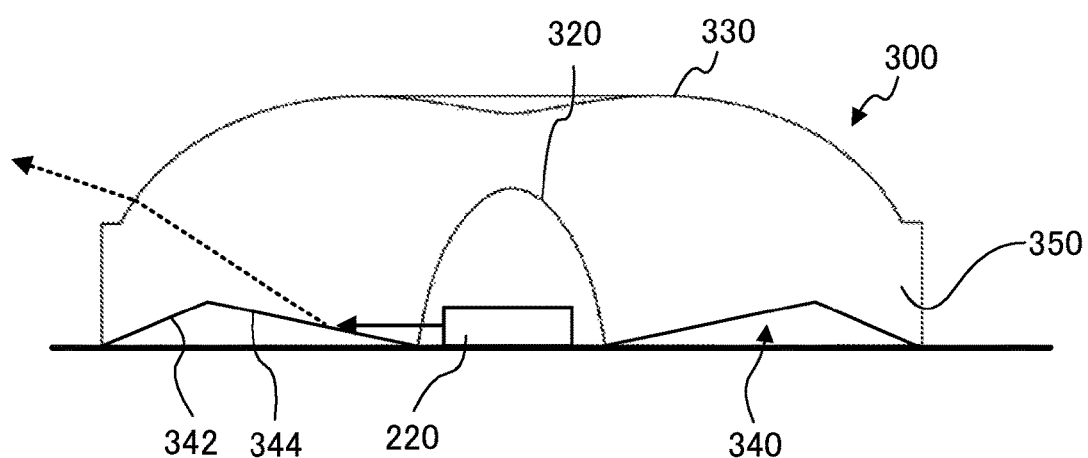
FIG. 15 is a view of another optical path in the light flux controlling member illustrated in FIGS. 10A to 10C.

The inner surface of second recess 340 is conventionally formed substantially parallel to central axis CA (see, for example, surface 34 in FIGS. 3A to 4B). Light traveling in a direction substantially orthogonal to central axis CA is scattered above the light flux controlling member, or the direction of the light is changed upward (see, e.g., the optical path view in FIG. 5) due to the inner surface and first inclining surface 342. Such light causes uneven luminance of light emitted from a surface light source device. Inclining the inner surface to become second inclining surface 344 enables reduction of the amount of light traveling in the optical paths as illustrated in FIG. 5. Second inclining surface 344 reflects or refracts light traveling in a direction substantially orthogonal to central axis CA to allow the light to travel in a lateral direction of the light flux controlling member (see FIG. 15; only light reflected by second inclining surface 344 is illustrated in FIG. 15). As seen from the foregoing, second inclining surface 344 suppresses light traveling toward above light flux controlling member 300, and is likely to suppress the generation of uneven luminance. For further suppressing the generation of uneven luminance due to the light scattered upward or whose direction is changed upward, second inclining surface 344 may be provided in, for example, a region where light entering light flux controlling member 300 from incidence surface 320 and traveling in a direction substantially orthogonal to central axis CA largely reaches.

In particular, when the light emitting element is a COB LED, the amount of light emitted in lateral directions of the LED is larger than that of a conventional LED, and thus the amount of light traveling in directions substantially orthogonal to central axis CA becomes larger. Therefore, especially with the light emitting element being a COB LED, light flux controlling member 300 of the present invention can suppress the generation of uneven luminance as compared to a conventional light flux controlling member.

For further suppressing the generation of uneven luminance due to light which is reflected by second inclining surface 344 and travels toward above light flux controlling member 300, second inclining surface 344 preferably inclines relative to a virtual straight line orthogonal to central axis CA at an angle smaller than a total reflection angle. The total reflection angle is an angle such that light, which travels in a direction orthogonal to central axis CA, enters the light flux controlling member from the edge of incidence surface 320 and reaches second inclining surface 344, is totally reflected to travel in a direction parallel to central axis CA. The inclination angle of second inclining surface 344 is an angle between a virtual straight line orthogonal to central axis CA, and a straight line connecting points which are included in a line segment representing second inclining surface 344 in any cross-section including central axis CA, and are closest to and farthest from emission surface 330. When second inclining surface 344 includes a plurality of inclining surfaces having different inclination angles as below-described Embodiment 2, the proportion of the surface area of inclining surface(s) whose inclination angle is smaller than the total reflection angle is preferably a half or more based on the total surface area of second inclining surface 344. When second inclining surface 344 includes a plurality of inclining surfaces having different inclination angles, for further suppressing the generation of uneven luminance, it is more preferred that all the inclination angles of these inclining surfaces are smaller than the total reflection angle.

On the other hand, for further suppressing of light scattering upward by allowing almost all the light traveling in directions substantially orthogonal to central axis CA to travel in lateral directions of the light flux controlling member, the inclination angle of second inclining surface 344 is preferably an angle at which the light is totally reflected. Further, for suppressing the formation of a surface substantially parallel to central axis CA between first inclining surface 342 and second inclining surface 344, the inclination angle of second inclining surface 344 is preferably an angle no smaller than an angle between a virtual straight line orthogonal to central axis CA, and a straight line connecting the bottom of second recess 340 and the lower end of first recess 310.

As obvious from below-described Embodiment 2, for further reducing uneven luminance, second inclining surface 344 preferably protrudes toward the rear side. In this case, second inclining surface 344 is, for example, a combination of a plurality of truncated cone surfaces having different inclination angles, or a curved surface having an inclination angle gradually changing toward outside, and in a cross-section including central axis CA, second inclining surface 344 has the shape of a combination of a plurality of line segments (see FIGS. 19A and 21A) or a curved line whose inclination angle increases toward outside (see FIG. 23A), each protruding toward the rear side.

For ease of molding, meanwhile, the inclination angle of second inclining surface 344 is preferably constant. In this case, second inclining surface 344 is in the shape of one truncated cone surface, and in a cross-section including central axis CA, second inclining surface 344 has the shape of a straight line (see FIG. 16B).

In FIG. 9, second recess 340 is formed in the whole rear side of light flux controlling member 300; however, second recess 340 may be formed in a part of the rear side of light flux controlling member 300 as long as first inclining surface 342 and second inclining surface 344 are formed in the above-described regions. In this case, a rear surface is formed in the rest of the rear side of light flux controlling member 300.

A plurality (e.g., two) of second recesses 340 may be formed in the rear side of light flux controlling member 300, and one of the recesses may have first inclining surface 342, and another one of the recesses may have second inclining surface 344. In this case, for further suppressing the generation of uneven luminance due to scattering of light traveling in a direction substantially orthogonal to central axis CA, second inclining surface 344 is preferably a surface on incidence surface 320 side in the recess closest to incidence surface 320 among the plurality of second recesses 340. However, presence of two or more second recesses 340 may cause slight scattering upward due to a surface formed substantially parallel to central axis CA, other than first inclining surface 342 and second inclining surface 344. For suppressing the slight scattering upward, it is preferred to form only one second recess 340, and set the outer surface thereof as first inclining surface 342 and the inner surface thereof as second inclining surface 344.

Flange 350 is located between the outer peripheral portion of emission surface 330 and the outer peripheral portion of the rear side of light flux controlling member 300, and protrudes radially outside. The shape of flange 350 is substantially annular. Although flange 350 is not an essential component, handling and alignment of light flux controlling member 300 become easier with flange 350 formed. The thickness of flange 350 can be determined in view of the required area of emission surface 330, formability of flange 350, and/or the like.

An optionally formed rear surface is a surface which is located on the rear side (substrate 210 side) of the light flux controlling member, and which extends in directions substantially orthogonal to central axis CA, and for example, a surface extending radially from the opening edge of recess 310.

Optionally formed legs are substantially cylindrical members protruding from the rear side of light flux controlling member 300. The legs support light flux controlling member 300 in an appropriate position relative to light emitting element 220.

[Simulation of Illuminance Distribution]

In the following, shown is simulation of illuminance distribution in a region immediately above light flux controlling member 300 for each shape of second inclining surface 344. Shown for comparison is illuminance distribution of a comparative light flux controlling member simulated in the same manner, which includes first inclining surface 342 but does not include second inclining surface 344.

On substrate 210, as illustrated in FIG. 8, disposed were light emitting element 220 which is a COB LED configured to emit light from five surfaces other than the bottom surface with lambertian light distribution, and light flux controlling member 300 or the comparative light flux controlling member, and illuminance distribution of a region which is on light diffusion member 120 and above each light flux controlling member was measured. Light emitting element 220 was disposed so that the upper surface thereof was at a higher position in the vertical direction than the lower end of first recess 310 in light flux controlling member 300 or in the comparative light flux controlling member was. Light flux controlling member 300 and the comparative light flux controlling member used for the simulation differ only in the presence or absence of second inclining surface 344. Parameters of light flux controlling members 300 and the comparative light flux controlling member were set as described below. Illuminance distribution for each of light flux controlling members 300 which have different second inclination surfaces with different inclination angles and inner diameters was measured and compared with illuminance distribution for the comparative light flux controlling member.

(Common Parameters)

Outer diameter of light flux controlling member: 15.5 mm
Outer diameter of emission surface: 15.0 mm
Opening diameter of first recess: 2.0 mm
Height from substrate surface to incidence surface edge: 0.02 mm
Inner diameter of first inclining surface: 9.4 mm
Outer diameter of first inclining surface: 15.5 mm
Height of inner diameter part of first inclining surface: 0.7 mm
Height of light emitting element: 0.35 mm
Size of light emitting element: 1.5 mm×1.5 mm Embodiment 1

Embodiment 1 relates to a mode in which second inclining surface 344 has the shape of one truncated cone surface. In this mode, second inclining surface 344 has the shape of a straight line in a cross-section passing central axis CA.

Figure 16A:
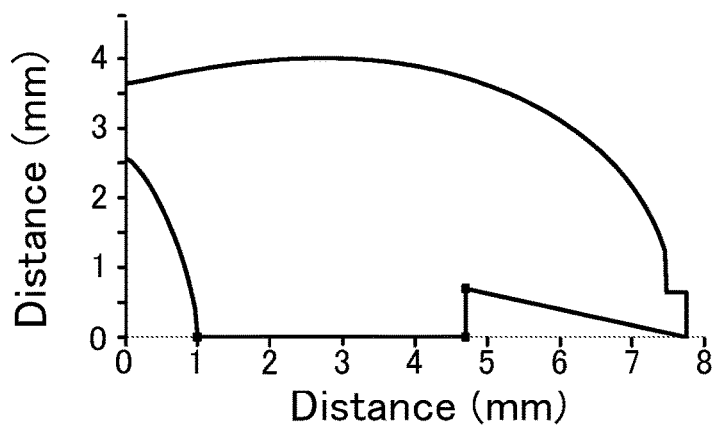
FIG. 16A is a partial cross-sectional view schematically illustrating a comparative light flux controlling member.
Figure 16B:
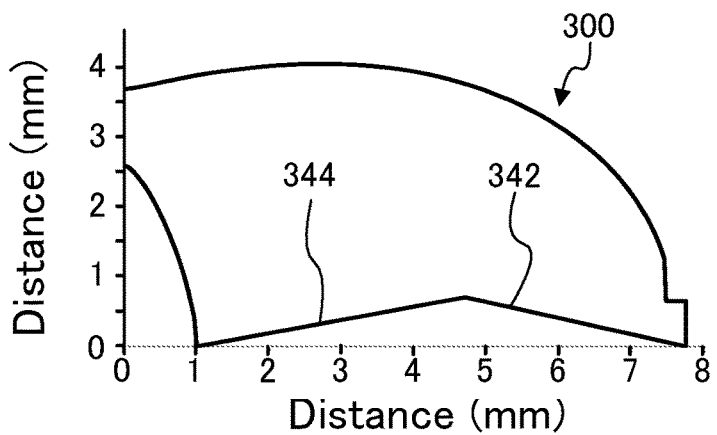
FIG. 16B is a partial cross-sectional view schematically illustrating a light flux controlling member according to Embodiment 1.

FIG. 16A is a partial cross-sectional view in a cross-section passing central axis CA schematically illustrating a comparative light flux controlling member among light flux controlling members used for the simulation. The comparative light flux controlling member includes first inclining surface 342 but does not include any second inclining surface. FIG. 16B is a partial cross-sectional view in a cross-section passing central axis CA schematically illustrating light flux controlling member 300 among light flux controlling members used for the simulation. Light flux controlling member 300 includes both first inclining surface 342 and second inclining surface 344. In FIG. 16B, second recess 340 is formed in the whole rear side of light flux controlling member 300, and first inclining surface 342 and second inclining surface 344 are continuously formed. In FIGS. 16A and 16B, the ordinate represents the distance (mm) from the lower end of first recess 310 of the light flux controlling member in the vertical direction, and the abscissa represents the distance (mm) from central axis CA of the light flux controlling member in the horizontal direction. Further, in FIGS. 16A and 16B, the shape of the comparative light flux controlling member or light flux controlling member 300 is shown in thick line.

Figure 16C:
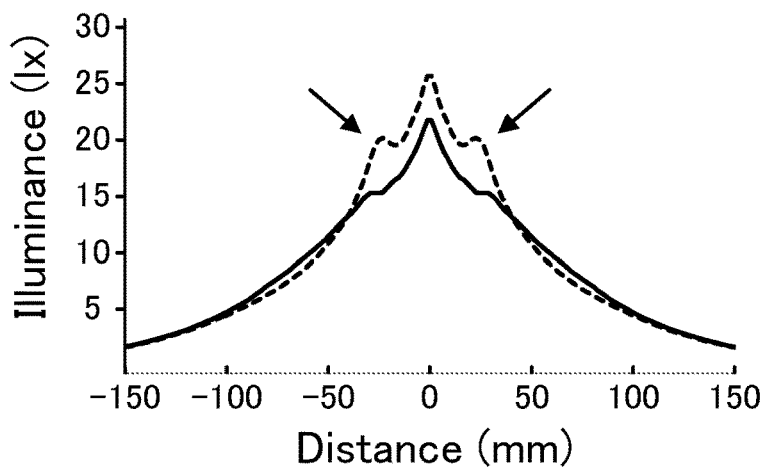
FIG. 16C is a graph of simulation of illuminance distribution in regions immediately above the light flux controlling members illustrated in FIGS. 16A and 16B, respectively.

FIG. 16C shows simulation of illuminance distribution in regions immediately above the comparative light flux controlling member illustrated in FIG. 16A and light flux controlling member 300 illustrated in FIG. 16B. In FIG. 16C, the ordinate represents the illuminance (lx), and the abscissa represents the distance (mm) from central axis CA of the light flux controlling member in the horizontal direction. In FIG. 16C, broken line shows the simulation of the comparative light flux controlling member, and thick line shows the simulation of light flux controlling member 300.

As obvious from FIG. 16C, the comparative light flux controlling member generated parts (shown with two arrows in the drawing) having a high illuminance in the vicinity of the upper part of the light emitting device compared to neighboring parts. Light flux controlling member 300 according to the present embodiment, meanwhile, did not generate such a part having a higher illuminance Regarding light flux controlling member 300 according to the present embodiment, the illuminance of the region immediately above light flux controlling member 300 became lower, while illuminances of peripheral regions became higher, and thus illuminance distribution became a chevron shape with smoother slopes.

Figure 17A:
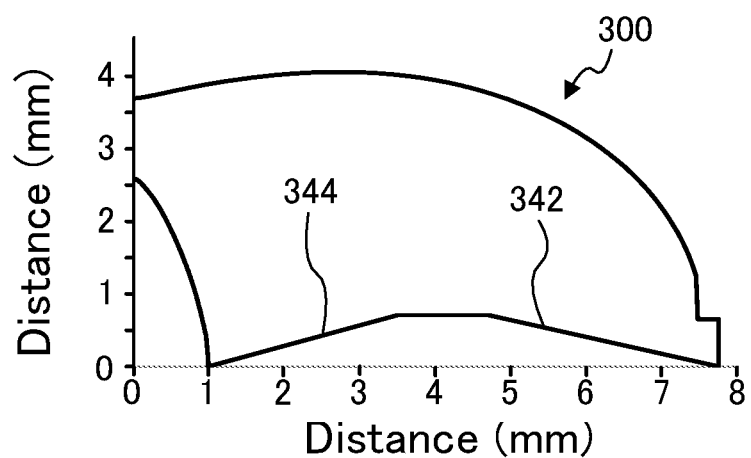
FIG. 17A is a partial cross-sectional view schematically illustrating another light flux controlling member according to Embodiment 1.

FIG. 17A is a partial cross-sectional view in a cross-section passing central axis CA schematically illustrating another light flux controlling member 300 among light flux controlling members used for the simulation. Light flux controlling member 300 includes both first inclining surface 342 and second inclining surface 344. In FIG. 17A, second recess 340 is formed in the whole rear side of light flux controlling member 300, and a non-inclining surface rotationally symmetric about central axis CA is formed between first inclining surface 342 and second inclining surface 344. In FIG. 17A, the ordinate represents the distance (mm) from the lower end of first recess 310 of light flux controlling member 300 in the vertical direction, and the abscissa represents the distance (mm) from central axis CA of light flux controlling member 300 in the horizontal direction. Further, in FIG. 17A, the shape of light flux controlling member 300 is shown in thick line.

Figure 17B:
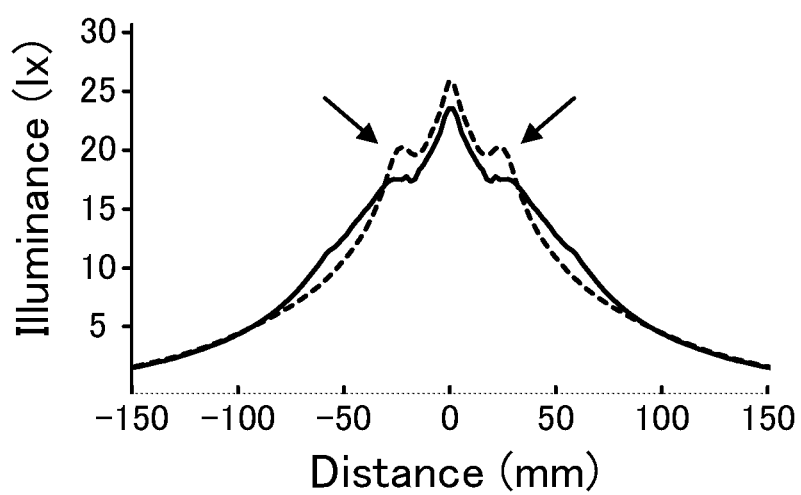
FIG. 17B is a graph of simulation of illuminance distribution in regions immediately above the light flux controlling members illustrated in FIGS. 16A and 17A, respectively.

FIG. 17B shows simulation of illuminance distribution in regions immediately above the comparative light flux controlling member illustrated in FIG. 16A and light flux controlling member 300 illustrated in FIG. 17A. In FIG. 17B, the ordinate represents the illuminance (lx), and the abscissa represents the distance (mm) from central axis CA of the light flux controlling member in the horizontal direction. In FIG. 17B, broken line shows the simulation of the comparative light flux controlling member, and thick line shows the simulation of light flux controlling member 300.

As obvious from FIG. 17B, the comparative light flux controlling member generated parts (shown with two arrows in the drawing) having a high illuminance in the vicinity of the upper part of the light emitting device compared to neighboring parts. Light flux controlling member 300 according to the present embodiment, meanwhile, did not generate such a part having a higher illuminance Regarding light flux controlling member 300 according to the present embodiment, the illuminance of the region immediately above light flux controlling member 300 became lower, while illuminances of peripheral regions became higher, and thus illuminance distribution became a chevron shape with smoother slopes.

Figure 18A:
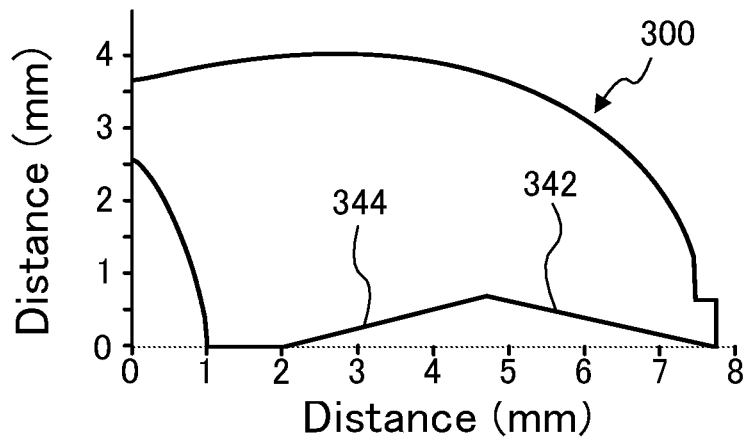
FIG. 18A is a partial cross-sectional view schematically illustrating another light flux controlling member according to Embodiment 1.

FIG. 18A is a partial cross-sectional view in a cross-section passing central axis CA schematically illustrating still another light flux controlling member 300 among light flux controlling members used for the simulation. Light flux controlling member 300 includes both first inclining surface 342 and second inclining surface 344. In FIG. 18A, second recess 340 is formed only in a part of the rear side of light flux controlling member 300, and first inclining surface 342 and second inclining surface 344 are continuously formed. In FIG. 18A, the ordinate represents the distance (mm) from the lower end of first recess 310 of light flux controlling member 300 in the vertical direction, and the abscissa represents the distance (mm) from central axis CA of light flux controlling member 300 in the horizontal direction. Further, in FIG. 18A, the shape of light flux controlling member 300 is shown in thick line.

Figure 18B:
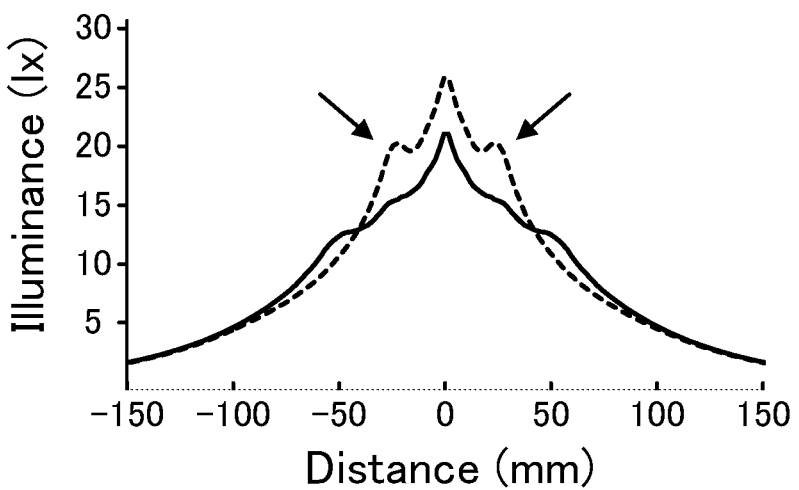
FIG. 18B is a graph of simulation of illuminance distribution in regions immediately above the light flux controlling members illustrated in FIGS. 16A and 18A, respectively.

FIG. 18B shows simulation of illuminance distribution in regions immediately above the comparative light flux controlling member illustrated in FIG. 16A and light flux controlling member 300 illustrated in FIG. 18A. In FIG. 18B, the ordinate represents the illuminance (lx), and the abscissa represents the distance (mm) from central axis CA of the light flux controlling member in the horizontal direction. In FIG. 18B, broken line shows the simulation of the comparative light flux controlling member, and thick line shows the simulation of light flux controlling member 300.

As obvious from FIG. 18B, the comparative light flux controlling member generated parts (shown with two arrows in the drawing) having a high illuminance in the vicinity of the upper part of the light emitting device compared to neighboring parts. Light flux controlling member 300 according to the present embodiment, meanwhile, did not generate such a part having a higher illuminance Regarding light flux controlling member 300 according to the present embodiment, the illuminance of the region immediately above light flux controlling member 300 became lower, while illuminances of peripheral regions became higher, and thus illuminance distribution became a chevron shape with smoother slopes.

As seen from the foregoing, light flux controlling member 300 according to the present embodiment is less likely to generate an annular-shaped region having high luminance above a recess which forms first inclining surface 342. The region is formed due to light scattered at an inner surface forming the recess. Regarding light flux controlling member 300 according to the present embodiment, the illuminance of the region immediately above light flux controlling member 300 becomes lower, while illuminances of peripheral regions become higher, and thus illuminance distribution became a chevron shape with smoother slopes. Therefore, light emitting device 200 according to the present embodiment can radiate light efficiently and in a chevron shape with smooth slopes compared to a light emitting device including the comparative light flux controlling member.

The above effects can be provided in all the following cases where, in a cross-section including central axis CA, the cross-sectional shape of second recess 340 is substantially V-shaped upside-down (FIG. 16B), and substantially a trapezoid devoid of the bottom and with a shorter top (FIG. 17A), and second recess 340 is formed only in a part of the rear side of light flux controlling member 300 (FIG. 18A).

As obvious from the comparison between FIG. 16C, 17B and FIG. 18B, a smaller inclination angle of second inclination surface 344 is better. That is, it is considered that a smaller inclination angle is more likely to allow a large portion of light which travels substantially parallel to central axis CA and is reflected or refracted by second inclining surface 344 to travel in a lateral direction of light flux controlling member 300. It should be noted that the inclination angle of second inclination surface 344 is preferably no smaller than an angle between a straight line connecting the lower ends of second recess 340 and first recess 310, and a virtual straight line orthogonal to central axis CA.

Embodiment 2

Embodiment 2 relates to a mode in which second inclining surface 344 of light flux controlling member 300 is assembled from a plurality of (two, in this embodiment) truncated cone surfaces having different inclination angles. In this mode, second inclining surface 344 is composed of a plurality of straight lines with its angle changing along the way in a cross-section including central axis CA.

FIGS. 19A, 20A, 21A and 22A are each a partial cross-sectional view in a cross-section passing central axis CA schematically illustrating still another light flux controlling member 300 among light flux controlling members used for the simulation. Light flux controlling member 300 includes both first inclining surface 342 and second inclining surface 344. In FIGS. 19A, 20A, 21A and 22A, second inclining surface 344 includes inclining surfaces 344a and 344b whose inclination angles are different. In FIGS. 19A, 20A, 21A and 22A, the ordinate represents the distance (mm) from the lower end of first recess 310 of light flux controlling member 300 in the vertical direction, and the abscissa represents the distance (mm) from central axis CA of light flux controlling member 300 in the horizontal direction. Further, in FIGS. 19A, 20A, 21A and 22A, the shape of each light flux controlling member 300 is shown in thick line.

Figure 19A:
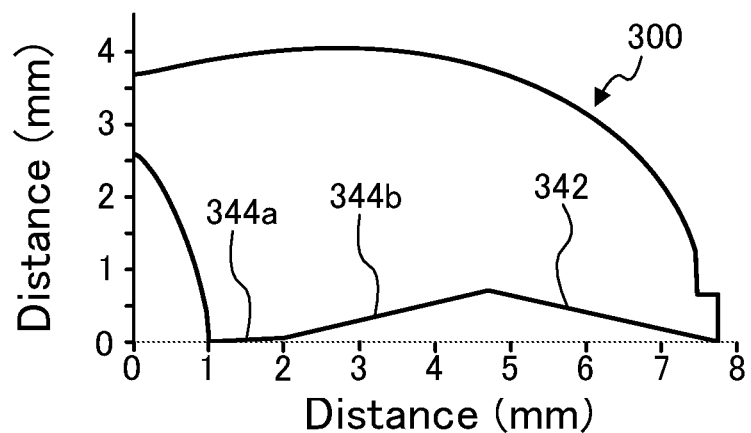
FIG. 19A is a partial cross-sectional view schematically illustrating a light flux controlling member according to Embodiment 2.
Figure 19B:
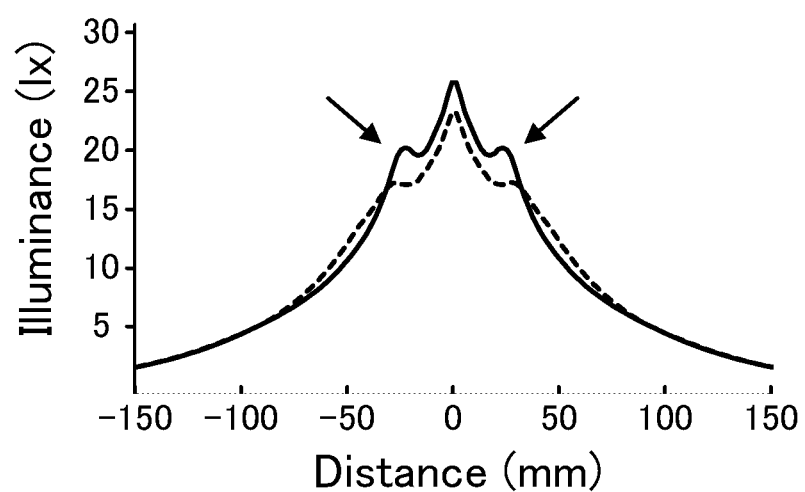
FIG. 19B is a graph of simulation of illuminance distribution in regions immediately above the light flux controlling members illustrated in FIGS. 16A and 19A, respectively.
Figure 20A:
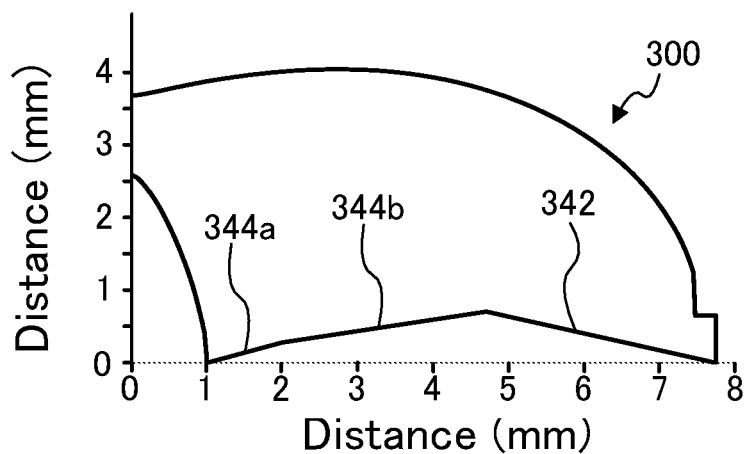
FIG. 20A is a partial cross-sectional view schematically illustrating another light flux controlling member according to Embodiment 2.
Figure 20B:
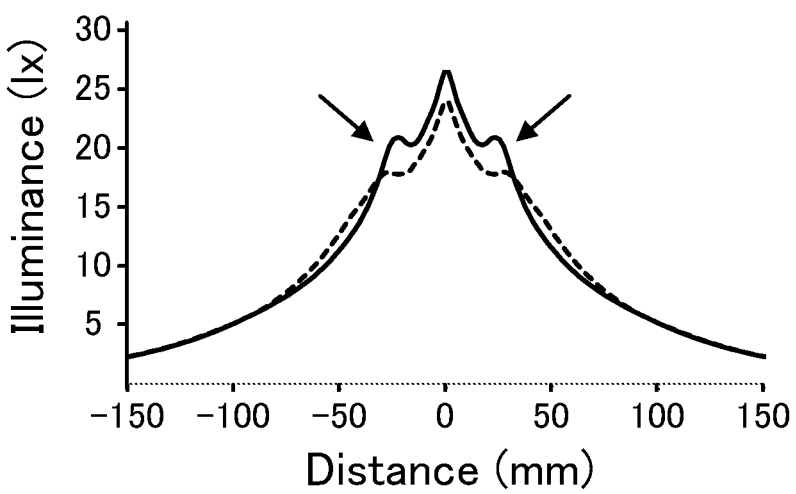
FIG. 20B is a graph of simulation of illuminance distribution in regions immediately above the light flux controlling members illustrated in FIGS. 16A and 20A, respectively.
Figure 21A:
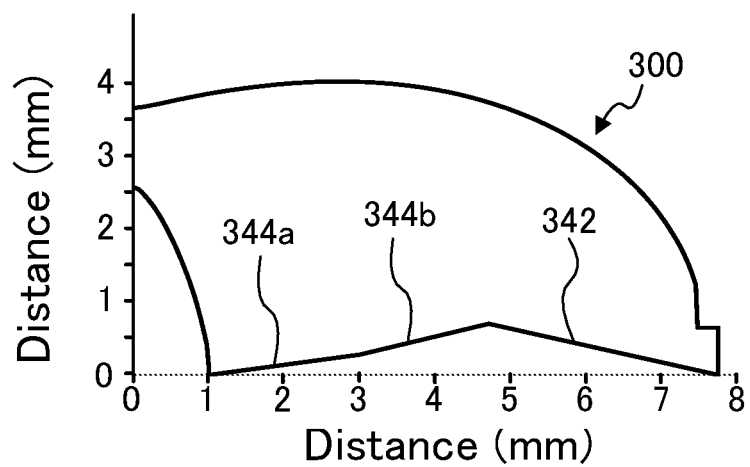
FIG. 21A is a partial cross-sectional view schematically illustrating another light flux controlling member according to Embodiment 2.
Figure 21B:
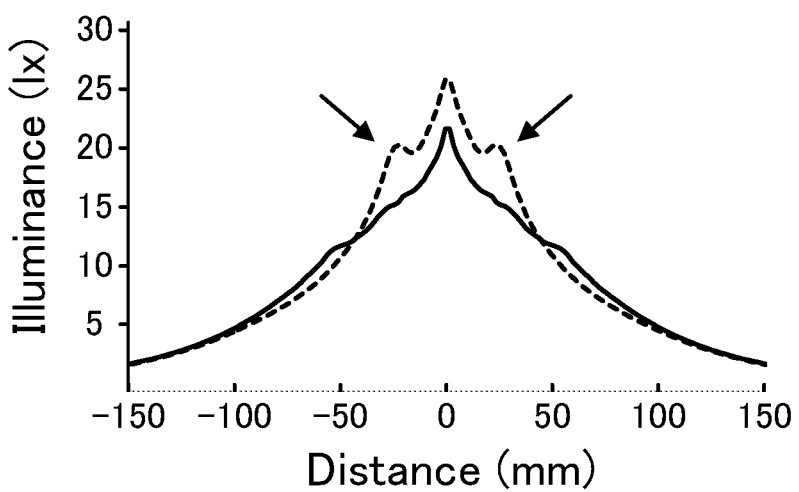
FIG. 21B is a graph of simulation of illuminance distribution in regions immediately above the light flux controlling members illustrated in FIGS. 16A and 21A, respectively.
Figure 22A:
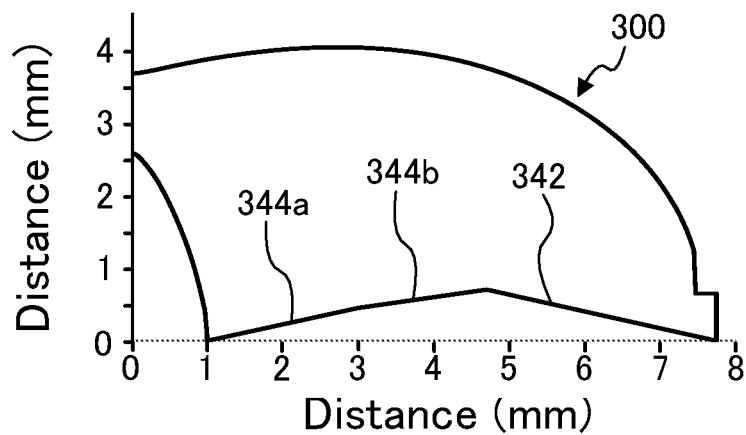
FIG. 22A is a partial cross-sectional view schematically illustrating another light flux controlling member according to Embodiment 2.
Figure 22B:
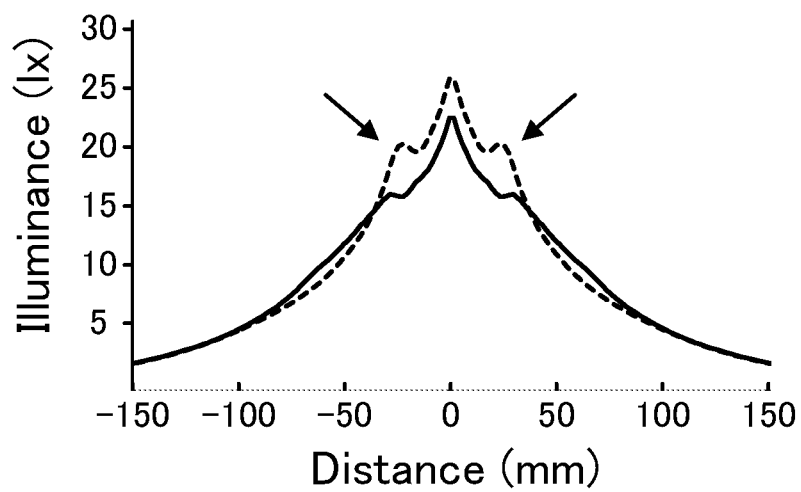
FIG. 22B is a graph of simulation of illuminance distribution in regions immediately above the light flux controlling members illustrated in FIGS. 16A and 22A, respectively.

FIGS. 19A and 21A illustrate light flux controlling members 300 each including second inclining surface 344 composed of a combination of two truncated cone surfaces having different inclination angles so that second inclining surface 344 protrudes toward the rear side. FIGS. 20A and 22A, meanwhile, illustrate light flux controlling members 300 each including second inclining surface 344 composed of a combination of two truncated cone surfaces having different inclination angles so that second inclining surface 344 protrudes toward the front side.

FIGS. 19B, 20B, 21B and 22B show simulation of illuminance distribution in regions immediately above the comparative light flux controlling member illustrated in FIG. 16A and respective light flux controlling members 300 illustrated in FIGS. 19A, 20A, 21A and 22A. In FIGS. 19B, 20B, 21B and 22B, the ordinate represents the illuminance (lx), and the abscissa represents the distance (mm) from central axis CA of the light flux controlling member in the horizontal direction. In FIGS. 19B, 20B, 21B and 22B, broken line shows the simulation of the comparative light flux controlling member, and thick line shows the simulation of light flux controlling member 300.

As obvious from FIGS. 19B, 20B, 21B and 22B, the comparative light flux controlling member generated parts (shown with two arrows in the drawings) having a high illuminance in the vicinity of the upper part of the light emitting device compared to neighboring parts. Light flux controlling members 300 according to the present embodiment, meanwhile, did not generate such a part having a higher illuminance. Regarding each light flux controlling member 300 according to the present embodiment, the illuminance of the region immediately above light flux controlling member 300 became lower, while illuminances of peripheral regions became higher, and thus illuminance distribution became a chevron shape with smoother slopes.

Further, as obvious from FIGS. 16B, 19B, 20B, 21B and 22B, illuminance distribution became a smooth-sloped chevron shape when second inclining surface 344 was one truncated cone surface (FIG. 16B) compared to when composed of a combination of truncated cone surfaces having different inclination angles so as to protrude toward the front side (FIGS. 20A and 22A). Illuminance distribution became a further smoother-sloped chevron shape when second inclining surface 344 was composed of a combination of truncated cone surfaces having different inclination angles so as to protrude toward the rear side (FIGS. 19A and 21A).

Embodiment 3

Embodiment 3 relates to a mode in which second inclining surface 344 of light flux controlling member 300 is a curved line having an inclination angle gradually changing toward outside so that the surface protrudes toward the rear side. In this mode, second inclining surface 344 is substantially parabolic in a cross-section passing central axis CA.

Figure 23A:
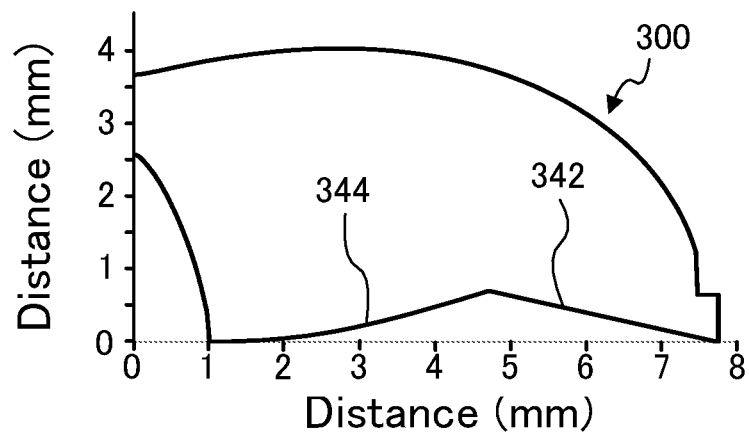
FIG. 23A is a partial cross-sectional view schematically illustrating a light flux controlling member according to Embodiment 3.

FIG. 23A is a partial cross-sectional view in a cross-section passing central axis CA schematically illustrating still another light flux controlling member 300 among light flux controlling members used for the simulation. Light flux controlling member 300 includes both first inclining surface 342 and second inclining surface 344. In FIG. 23A, second inclining surface 344 is a curved surface having an inclination angle gradually changing toward outside. In FIG. 23A, the ordinate represents the distance (mm) from the lower end of first recess 310 of light flux controlling member 300 in the vertical direction, and the abscissa represents the distance (mm) from central axis CA of light flux controlling member 300 in the horizontal direction. Further, in FIG. 23A, the shape of light flux controlling member 300 is shown in thick line.

Figure 23B:
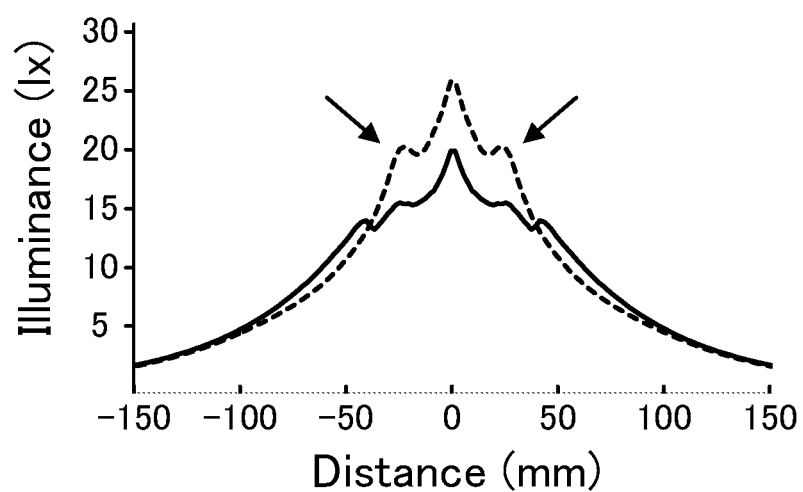
FIG. 23B is a graph of simulation of illuminance distribution in regions immediately above the light flux controlling members illustrated in FIGS. 16A and 23A, respectively.

FIG. 23B shows simulation of illuminance distribution in regions immediately above the comparative light flux controlling member illustrated in FIG. 16A and light flux controlling member 300 illustrated in FIG. 23A. In FIG. 23B, the ordinate represents the illuminance (lx), and the abscissa represents the distance (mm) from central axis CA of the light flux controlling member in the horizontal direction. In FIG. 23B, broken line shows the simulation of the comparative light flux controlling member, and thick line shows the simulation of light flux controlling member 300.

As obvious from FIG. 23B, the comparative light flux controlling member generated parts (shown with two arrows in the drawing) having a high illuminance in the vicinity of the upper part of the light emitting device compared to neighboring parts. Light flux controlling member 300 according to the present embodiment, meanwhile, was less likely to generate such a part having a higher illuminance. Regarding light flux controlling member 300 according to the present embodiment, the illuminance of the region immediately above light flux controlling member 300 became lower, while illuminances of peripheral regions became higher, and thus illuminance distribution became a chevron shape with smoother slopes.

Illuminance distribution had a smooth-sloped chevron shape when second inclining surface 344 was a curved line having an inclination angle gradually changing toward outside so that the surface protrudes toward the rear side (FIG. 23A) compared to when second inclining surface 344 had the shape of one truncated cone surface having an constant inclination angle (FIG. 16B).

[Effects]

Accordingly, light flux controlling member 300 of the present invention enables suppression of an increase of illuminance in the vicinity of the upper part of a light emitting device, and enables the illuminance of the region immediately above light flux controlling member 300 to become lower, while illuminances of peripheral regions to become higher, and thus illuminance distribution immediately above light flux controlling member 300 to become a chevron shape with smoother slopes. In similar manner, light emitting device 200, surface light source device 100 and a display apparatus which include such light flux controlling member 300 are less likely to generate uneven luminance, and also likely to obtain more uniform illuminance distribution.

[Additional Mode]

Figure 24A:
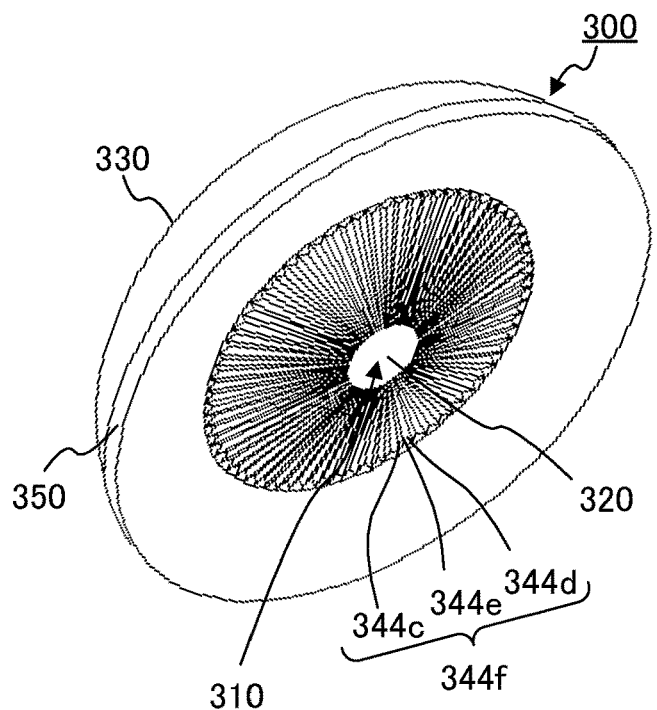
FIGS. 24A and 24B illustrate configurations of light flux controlling members according to another embodiment of the present invention.
Figure 24B:
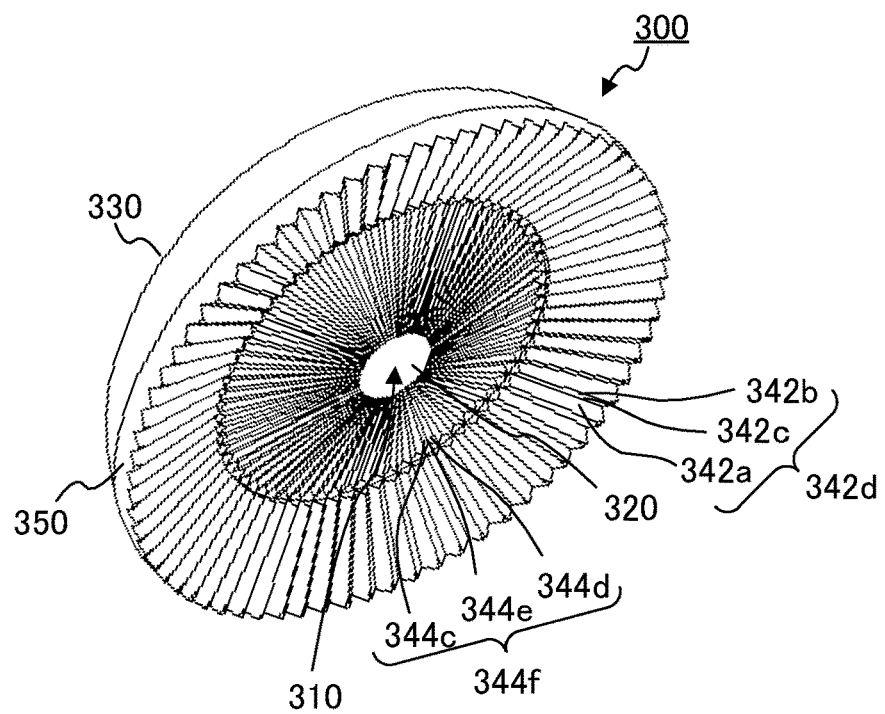

As illustrated in FIGS. 24A and 24B, second inclining surface 344 may be composed of protrusions 344f having a substantially triangle-shaped cross-section vertical to ridge line 344e, and rotationally symmetric about central axis CA. Protrusion 344f includes planar first reflection surface 344c, planar second reflection surface 344d, and ridge line 344e that is an intersection line of first reflection surface 344c and second reflection surface 344d. Such protrusion 344f also reflects or refracts light traveling in a direction substantially orthogonal to central axis CA to suppress the generation of uneven luminance, as the second inclining surfaces of Embodiments 1 to 3. An effect can be expected such that stray light in the system of surface light source device 100 is prevented from entering light flux controlling member 300 from emission surface 330, reaching second inclining surface 344 to reach a substrate immediately below light flux controlling member 300 by retroreflection at protrusion 344f. This may suppress reduction of light use efficiency.

Light flux controlling member 300 may include only protrusions 344d as illustrated in FIG. 24A, or both protrusions 344d and protrusions 342d as illustrated in FIG. 24B.

In either mode illustrated in FIG. 24A or 24B, for easier alignment between molds, and for using as a reference surface during measurement of, e.g., the height of protrusion 342d and/or protrusion 344f, and/or the depth of second recess 340, a non-inclining part including non-inclining surface 343 may also be formed in a part of an adjacent side between continuously formed first inclining surface 342 and second inclining surface 344 in light flux controlling member 300. For easier alignment between molds, light flux controlling member 300 preferably includes non-inclining parts at two respective positions substantially facing each other with central axis CA therebetween, and preferably includes at least one pair of the non-inclining parts substantially facing each other. From the perspective of using non-inclining surface 343 as a measurement reference surface for accurately determining the positions of first inclining surface 342 and second inclining surface 344 in the height direction along central axis CA, light flux controlling member 300 preferably includes at least two non-inclining parts at respective positions rotationally symmetric about central axis CA, for easy measurement and obtaining stable measurement result. However, for suppressing generation of uneven luminance as much as possible, a smaller number of non-inclining parts in light flux controlling member 300 is preferred, and only two pairs of the non-inclining parts substantially facing each other are preferably included in view of the balance between the alignment effect and the uneven luminance suppressing effect.

This application claims priority based on Japanese Patent Application No. 2015-132803, filed on Jul. 1, 2015, and Japanese Patent Application No. 2016-103266, filed on May 24, 2016, the entire contents of which including the specifications, the claims and the drawings are incorporated herein by reference.

INDUSTRIAL APPLICABILITY

The light flux controlling member, light emitting device and surface light source device of the present invention may be employed, for example, in a backlight of a liquid crystal display apparatus or a general lightning.

REFERENCE SIGNS LIST

10 Light emitting element
20, 30 Light flux controlling member
22 Incidence surface
24 Emission surface
26 Rear surface
32 Inclining surface
34 Surface substantially parallel to central axis
100 Surface light source device
110 Casing
112 Bottom plate
114 Top plate
120 Light diffusion member
200 Light emitting device
210 Substrate
220 Light emitting element
300 Light flux controlling member
310 First recess
320 Incidence surface
330 Emission surface
330a First emission surface
330b Second emission surface
330c Third emission surface
340 Second recess
342 First inclining surface
342a First reflection surface
342b Second reflection surface
342c Ridge line
342d Protrusion
343 Non-inclining surface
344 Second inclining surface
344a Inclining surface
344b Inclining surface
344c First reflection surface
344d Second reflection surface
344e Ridge line
344f Protrusion
350 Flange
CA Central axis of light flux controlling member
OA Optical axis of light emitting element

The invention claimed is:

1. A light flux controlling member configured to control distribution of light emitted from a light emitting element, the light flux controlling member comprising:
an incidence surface being an inner surface of a first recess formed on a rear side of the light flux controlling member so as to intersect a central axis of the light flux controlling member, the incidence surface being a surface where light emitted from the light emitting element is incident;
an emission surface formed on a front side of the light flux controlling member so as to intersect the central axis, the emission surface being configured to emit the light incident on the incidence surface toward an outside of the light flux controlling member; and
a second recess formed on the rear side so as to surround the central axis on an outer side compared to the incidence surface, the second recess being recessed toward an inside of the light flux controlling member, wherein:
the second recess includes a first inclining surface and a second inclining surface both inclining relative to a virtual straight line orthogonal to the central axis, wherein:
the second inclining surface is formed in a region closer to the central axis than the first inclining surface is,
the first inclining surface inclines at an angle such that at least a part of light entering the light flux controlling member from the incidence surface and reflected by Fresnel reflection at the emission surface is reflected,
the first inclining surface inclines in a direction toward the rear side as being further away from the central axis, and
the second inclining surface inclines in a direction toward the front side as being further away from the central axis,
the second recess further includes a non-inclining part having a non-inclining surface parallel to the virtual straight line orthogonal to the central axis, and
in a cross-section of the light flux controlling member including the central axis, the first inclining surface and the second inclining surface are directly connected, and in another cross-section of the light flux controlling member including the central axis, the first inclining surface and the second inclining surface are connected via the non-inclining part.

2. The light flux controlling member according to claim 1, wherein the second inclining surface inclines relative to the virtual straight line orthogonal to the central axis at an angle smaller than a total reflection angle at which light traveling in a direction orthogonal to the central axis, the light entering the light flux controlling member from an edge of the incidence surface and reaching the second inclining surface is totally reflected in a direction parallel to the central axis.

3. The light flux controlling member according to claim 1, wherein the second inclining surface protrudes in a direction toward the rear side.

4. The light flux controlling member according to claim 1, wherein the second inclining surface has a constant inclination angle.

5. A light emitting device comprising a light emitting element and the light flux controlling member according to claim 1, wherein the light flux controlling member is disposed at a position where the central axis coincides with an optical axis of the light emitting element.

6. The light emitting device according to claim 5, wherein the light emitting element is a chip-on-board (COB) light emitting diode (LED).

7. A surface light source device comprising the light emitting device according to claim 5, and a light diffusion member for diffusing and transmitting light emitted from the light emitting device at the same time.

8. A display apparatus comprising the surface light source device according to claim 7 and a display member to be irradiated with light emitted from the surface light source device.

* * * * *